United States Patent
Tomita et al.

(10) Patent No.: US 10,071,597 B2
(45) Date of Patent: Sep. 11, 2018

(54) PNEUMATIC TIRE

(71) Applicant: SUMITOMO RUBBER INDUSTRIES, LTD., Kobe-shi, Hyogo (JP)

(72) Inventors: Shintaro Tomita, Kobe (JP); Susumu Tanaka, Kobe (JP); Kazuo Asano, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 135 days.

(21) Appl. No.: 14/913,600

(22) PCT Filed: Aug. 27, 2014

(86) PCT No.: PCT/JP2014/072378
§ 371 (c)(1),
(2) Date: Feb. 22, 2016

(87) PCT Pub. No.: WO2015/037440
PCT Pub. Date: Mar. 19, 2015

(65) Prior Publication Data
US 2016/0200142 A1  Jul. 14, 2016

(30) Foreign Application Priority Data

Sep. 10, 2013  (JP) .................................. 2013-186883
Sep. 26, 2013  (JP) .................................. 2013-199888

(51) Int. Cl.
*B60C 9/02*     (2006.01)
*B60C 3/04*     (2006.01)
(Continued)

(52) U.S. Cl.
CPC ................. *B60C 3/04* (2013.01); *B60C 9/02* (2013.01); *B60C 9/0292* (2013.01); *B60C 9/18* (2013.01);
(Continued)

(58) Field of Classification Search
CPC .................................... B60C 3/04; B60C 3/02
See application file for complete search history.

(56) References Cited

U.S. PATENT DOCUMENTS 5,238,039 A * 8/1993 Nakajima ................. B60C 3/04
                                                      152/454
5,373,884 A    12/1994 Kamegawa et al.
(Continued)

FOREIGN PATENT DOCUMENTS

JP    51-141101 A    12/1976
JP    4-218413 A     8/1992
(Continued)

OTHER PUBLICATIONS

Nakajima, Y., Kadowaki, H., Kamegawa, T. and Ueno, K., 1999. Application of a neural network for the optimization of tire design. Tire Science and Technology, 27(2), pp. 62-83.<http://www.tiresciencetechnology.org/doi/abs/10.2346/1.2135978?code=tire-site> (Year: 1999).*

(Continued)

*Primary Examiner* — Alison L Hindenlang
*Assistant Examiner* — Nicholas R Krasnow
(74) *Attorney, Agent, or Firm* — Birch, Stewart, Kolasch & Birch, LLP

(57) ABSTRACT

[Object] A pneumatic tire 2 that allows achievement of reduction of rolling resistance without taking influence on a mass into consideration, is provided.
[Solution] A profile OL of the tire 2 includes a ground-contact surface 46 and a pair of side surfaces 48. In the
(Continued)

profile OL, a zone from a point PB to a point PW is formed by three arcs. The arcs are a first arc, a second arc that extends almost outward from the first arc in the radial direction, and a third arc that extends almost outward from the second arc further in the radial direction. A ratio of a radius R2 of curvature of the second arc to a radius R1 of curvature of the first arc is greater than or equal to 1.45 and not greater than 3.26. A ratio of a radius R3 of curvature of the third arc to the radius R1 of curvature of the first arc is greater than or equal to 0.45 and not greater than 0.56. Each sidewall 8 of the tire 2 has a first recess 50a and a second recess 50b that are recessed inward from the side surface 48.

10 Claims, 11 Drawing Sheets

(51) Int. Cl.

| | | |
|---|---|---|
| *B60C 9/18* | (2006.01) | |
| *B60C 11/00* | (2006.01) | |
| *B60C 13/00* | (2006.01) | |
| *B60C 15/00* | (2006.01) | |
| *B60C 15/06* | (2006.01) | |
| *B60C 13/02* | (2006.01) | |

(52) U.S. Cl.
CPC .............. *B60C 11/00* (2013.01); *B60C 13/00* (2013.01); *B60C 13/003* (2013.01); *B60C 13/02* (2013.01); *B60C 15/00* (2013.01); *B60C 15/0036* (2013.01); *B60C 15/06* (2013.01); *Y02T 10/862* (2013.01)

(56) References Cited

U.S. PATENT DOCUMENTS

| | | |
|---|---|---|
| 5,710,718 A | 1/1998 | Kamegawa et al. |
| 2010/0139834 A1* | 6/2010 | Koga .................. B60C 3/04 152/560 |

FOREIGN PATENT DOCUMENTS

| | | | |
|---|---|---|---|
| JP | 8-142601 A | | 6/1996 |
| JP | 8-142602 A | | 6/1996 |
| JP | 2005-219537 A | | 8/2005 |
| JP | 2011037372 A | * | 2/2011 |
| JP | 2013-10433 A | | 1/2013 |
| JP | 2014-101054 A | | 6/2014 |

OTHER PUBLICATIONS

Extended European Search Report, dated Mar. 27, 2017 for European Application No. 14844468.0.

International Search Report, issued in PCT/JP2014/072378, dated Dec. 2, 2014.

Written Opinion of the International Searching Authority, issued in PCT/JP2014/072378(PCT/ISA/237), dated Dec. 2, 2014.

* cited by examiner

PNEUMATIC TIRE

TECHNICAL FIELD

The present invention relates to pneumatic tires.

BACKGROUND ART

In recent years, development of vehicles that allow fuel consumption to be reduced in consideration of the environment is advanced. Pneumatic tires are mounted to the vehicles. The pneumatic tires act to support vehicle bodies, and to transmit power with respect to road surfaces. The tires exert influence on fuel efficiency of the vehicles.

Development of tires is also advanced in view of achieving reduction in fuel consumption of vehicles. In this development, examination is made so as to focus on rolling resistance of the tires. An exemplary examination is disclosed in JP2005-219537.

Conventionally, for commercially available replacement tires, multiple sizes of the tires are lined up for one tread pattern. Up to more than 70 sizes of tires are lined up for one tread pattern in some cases. The tire sizes are defined in the standard (for example, JATMA standard). The tire size is represented as, for example, 195/65R15. 195 represents a nominal width (mm), 65 represents a nominal aspect ratio, R represents radial, and 15 represents a nominal rim diameter (inch). Among them, in a manner for extending and developing tire widths for one aspect ratio, a representative tire width for the one aspect ratio is firstly selected. A profile of a mold for the representative tire width is designed. A profile of a mold for each tire width is determined so as to have a shape similar to the representative profile. Subsequently, in consideration of a required rubber gauge, a carcass profile for each tire width is designed. The carcass profile refers to a shape represented by the center line (carcass line) of the thickness of the carcass.

As described above, in order to extend and develop the tire widths, the carcass profile needs to be designed for each tire width. The number of steps in the designing is increased according to the number of the tire widths to increase a load. Since the carcass profile is designed for each tire width, variation in designing may occur. As a result, the carcass profile for a tire having a certain tire width greatly changes between before inflation and after inflation, so that excess distortion may be generated in rubber and cords. In other words, the carcass profile may deviate from a natural equilibrium shape.

The carcass profile based on the natural equilibrium shape theory represents an equilibrium shape of the carcass which is formed such that, when the tire is inflated to a normal internal pressure, a tensile force of the carcass balances with a tire internal pressure and a reaction force from a belt in a case where forces other than the tire internal pressure and the reaction force from the belt are not applied. The carcass based on the natural equilibrium shape theory is varied so as to approximate the entirety of the shape thereof to almost similar shapes according to increase or reduction of the internal pressure. This means that the carcass is almost uniformly deformed according to increase or reduction of the internal pressure, and an amount of the deformation is small. In a case where the carcass is not in the equilibrium state in which the carcass profile changes so as to have similar shapes according to change of the internal pressure, that is, the carcass does not have the natural equilibrium shape, durability of the tire may be reduced due to concentration of stress or distortion.

In JP08-142601, a method for manufacturing a radial tire by applying the natural equilibrium shape theory is suggested. In this manufacturing method, protrusion of the carcass profile according to change of tire internal pressure is defined in order to improve vibration resistance and ride comfort. Also in JP08-142602, a method for manufacturing a radial tire by applying the natural equilibrium shape theory is suggested. In this manufacturing method, a radius (radius of curvature) of the carcass profile is defined in order to improve vibration resistance and ride comfort.

However, also in a case where the carcass profile is designed by applying the natural equilibrium shape theory, the carcass profile is designed for each tire width, whereby the number of steps in the designing is increased according to the number of the tire widths to increase a load.

CITATION LIST

Patent Literature

Patent Literature 1: JP2005-219537
Patent Literature 2: JP08-142601
Patent Literature 3: JP08-142602

SUMMARY OF THE INVENTION

Problems to be Solved by the Invention

The mass of a tire exerts an influence on the above-described rolling resistance. From the viewpoint of reducing the rolling resistance, reduction in weight of the tire is examined in some cases.

Reduction of the volume of a tread leads to reduction of the weight of the tire. In this case, grooves in the tread surface may become shallow. The shallow grooves affect wear resistance. The shallow grooves make drainage performance insufficient.

Thin sidewalls are adopted from the viewpoint of reducing the weight in some cases. The thin sidewalls may cause poor outer appearance such as bulge, dent, or the like. Tires having thin sidewalls are poor in impact resistance.

An object of the present invention is to provide a pneumatic tire that allows achievement of reduction of rolling resistance without taking influence on a mass into consideration.

Further, the present invention is made in view of the current circumstances where, also in a case where a carcass profile is designed by applying the natural equilibrium shape theory, since the carcass profile is designed for each tire width, the number of steps in the designing is increased according to the number of the tire widths to increase a load, and another object of the present invention is to provide: a carcass profile determination method for quickly determining a carcass profile with ease in order to extend a series of tire widths; and a pneumatic tire that is manufactured by applying the method.

Solution to the Problems

A pneumatic tire according to the present invention includes; a tread; a pair of sidewalls that extend from ends, respectively, of the tread almost inward in a radial direction; a pair of clinches disposed inward of the sidewalls, respectively, in the radial direction; a pair of beads disposed inward of the clinches, respectively, in an axial direction; and a carcass extended, along inner sides of the tread and the sidewalls, on and between one of the beads and the other of the beads. A profile of the tire includes a ground-contact surface, and a pair of side surfaces that extend from the ground-contact surface almost inward in the radial direction.

In the tire, a maximum value of a distance, in the axial direction, between both the side surfaces represents a maximum width of the tire. The tire is defined such that: a boundary between the ground-contact surface and each side surface is a point PB; a point, on the side surface, representing the maximum width is a point PW; an imaginary straight line that extends through each point PW in the axial direction is a first reference line; a length, in the radial direction, from the first reference line to an equator is a first reference length; a point, on the side surface, which is disposed outward of the point PW in the radial direction, and which is distant from the first reference line in the radial direction, by a length corresponding to ⅓ of the first reference length, is a point PU1; a point, on the side surface, which is disposed outward of the point PU1 in the radial direction, and which is distant from the point PU1 in the radial direction, by a length corresponding to ⅓ of the first reference length, is a point PU2; a point, on the side surface, disposed at a mid-position between the point PU2 and the point PU1 in the radial direction, is a point PU3; a point, on the side surface, disposed at a mid-position between the point PU2 and the point PB in the radial direction, is a point PU4; an end point of the side surface is a point PT; an imaginary straight line that extends through each point PT in the axial direction is a second reference line; a length, in the radial direction, from the second reference line to the equator represents a cross-sectional height of the tire; a length, in the radial direction, from the second reference line to the point PW is a second reference length; a point, on the side surface, which is disposed inward of the point PW in the radial direction, and which is distant from the first reference line in the radial direction, by a length corresponding to ⅓ of the second reference length, is a point PL1; a point, on the side surface, which is disposed inward of the point PL1 in the radial direction, and which is distant from the first reference line in the radial direction, by a length corresponding to ¹¹⁄₂₀ of the second reference length, is a point PL2; and a thickness of each sidewall at the point PW is a reference thickness.

A zone from the point PB to the point PW on each side surface is formed by three main arcs. The main arcs are a first main arc, a second main arc that extends almost outward from the first main arc in the radial direction, and a third main arc that extends almost outward from the second main arc further in the radial direction. The first main arc extends through the point PW and the point PU1 The second main arc extends through the point PU1, the point PU3, and the point PU2 The third main arc extends through the point PU2, the point PU4, and the point PB. A ratio of a radius RM2 of curvature of the second main arc to a radius RM1 of curvature of the first main arc is greater than or equal to 1.45 and not greater than 3.26. A ratio of a radius RM3 of curvature of the third main arc to the radius RM1 of curvature of the first main arc is greater than or equal to 0.45 and not greater than 0.56. An extension line from the first main arc extends through an imaginary point PU5 defined such that the imaginary point PU5 and the point PU1 are line-symmetric with respect to the first reference line.

A zone from the point PW to the point PL2 on each side surface is formed by a fourth main arc. The fourth main arc extends through the point PW, the point PL1, and the point PL2. An extension line from the fourth main arc extends through an imaginary point PL3 defined such that the imaginary point PL3 and the point PL1 are line-symmetric with respect to the first reference line.

Each sidewall has a first recess and a second recess that are recessed inward from the side surface. The first recess is disposed outward of the point PW in the radial direction. The second recess is disposed inward of the point PW in the radial direction. A ratio of a length SU, in the radial direction, from the first reference line to a bottom of the first recess, relative to the cross-sectional height, is greater than or equal to 0.08 and not greater than 0.24. A ratio of a length SL, in the radial direction, from the first reference line to a bottom of the second recess, relative to the cross-sectional height, is greater than or equal to 0.08 and not greater than 0.24. A ratio of a depth TU of the first recess to the reference thickness is greater than or equal to 0.16 and not greater than 0.48. A ratio of a depth TL of the second recess to the reference thickness is greater than or equal to 0.16 and not greater than 0.48.

According to another aspect, a method for determining a carcass profile of a tire according to the present invention is a method for determining a carcass profile of a tire that includes a carcass, a belt layered over the carcass, and beads, and the method includes the steps of:

forming a representative carcass profile for a tire having a representative tire width, among tires for one aspect ratio, by applying a natural equilibrium shape theory, the representative carcass profile being a carcass profile having a natural equilibrium shape; and calculating a carcass profile based on the natural equilibrium shape theory, by using positions of four specific points of a point A, a point B, a point C, and a point D of a tire which has the same aspect ratio as the tire having the representative tire width and which has another tire width, the point A, the point B, the point C, and the point D corresponding to four specific points on the carcass profile, having the natural equilibrium shape, of the tire having the representative tire width, and in the carcass profile calculating step, the following mathematical expression for calculating a tire internal pressure share ratio Tb of the belt at any of positions Z on the carcass in a range in which the carcass and the belt are layered, is used $$Tb = \tau o - a(ZA-Z)/(ZA-ZB),$$

ZA corresponds to a coordinate position of the point A in a Z-axis direction,

ZB corresponds to a coordinate position of the point B in the Z-axis direction, on a cross-section perpendicular to a circumferential direction of the tire, the point A is a point of intersection of the carcass and a tire equator plane in a coordinate system in which: an originating point is a point of intersection of the tire equator plane and a tire rotation axis; a Y-axis represents a tire rotation axis direction; and a Z-axis represents a tire radial direction, the point B is a separation start point, in the coordinate system, at which the carcass and the belt separate from each other, $\tau o$ represents a tire internal pressure share ratio of the belt at the point A, a represents a reduced amount of the share ratio $\tau o$ at the point B, and a range from which values of $\tau o$ and a are each selected, is provided for each aspect ratio of the tire.

Preferably, the carcass profile calculating step includes setting a specific point numerical value range by applying the natural equilibrium shape theory, and the specific point numerical value range is a range from which coordinate positions of at least three points among the point A, the point B, the point C, and the point D that are the four specific points of the tire having said another tire width, are selected.

Preferably, a Y-coordinate value B(y) of the point B is set within a range for each tire width, and a Z-coordinate value D(z) of the point D is set within a range for each tire width.

Preferably, a Z-coordinate value A(z) of the point A is defined according to an inner diameter of a mold defined in a standard, a tread rubber thickness of a tread at a center portion in a tire axial direction, and a thickness of the belt, and a Y-coordinate value C(y) of the point C is defined according to ½ of an entire width of the mold defined in the standard, a thickness of a sidewall, and a thickness of a carcass in the case of the carcass having a highly turned-up structure.

According to still another aspect, a pneumatic tire according to the present invention includes: a tread; a pair of sidewalls that extend from both ends, respectively, of the tread almost inward in a tire radial direction; a pair of beads disposed inward of the sidewalls, respectively, in a tire axial direction; a carcass extended, along inner sides of the tread and the sidewalls, on and between one of the beads and the other of the beads; and a belt layered outward of the carcass in the tire radial direction, and a shape of the carcass in the case of the tire being mounted to a rim and inflated to an internal pressure, is determined based on the natural equilibrium shape theory, and any one of the above-described methods for determining the carcass profile is applied for determining the shape of the carcass.

Advantageous Effects of the Invention

A pneumatic tire according to the present invention allows achievement of reduction of rolling resistance without taking influence on a mass into consideration.

Further, in the method for determining a carcass profile of a tire according to the present invention, in order to extend a series of tire widths for one aspect ratio, carcass profiles for the different tire widths can be quickly determined with ease.

DESCRIPTION OF EMBODIMENTS

The following will describe in detail the present invention based on preferred embodiments with reference where appropriate to the accompanying drawing.

[First Embodiment]

Figure 1:
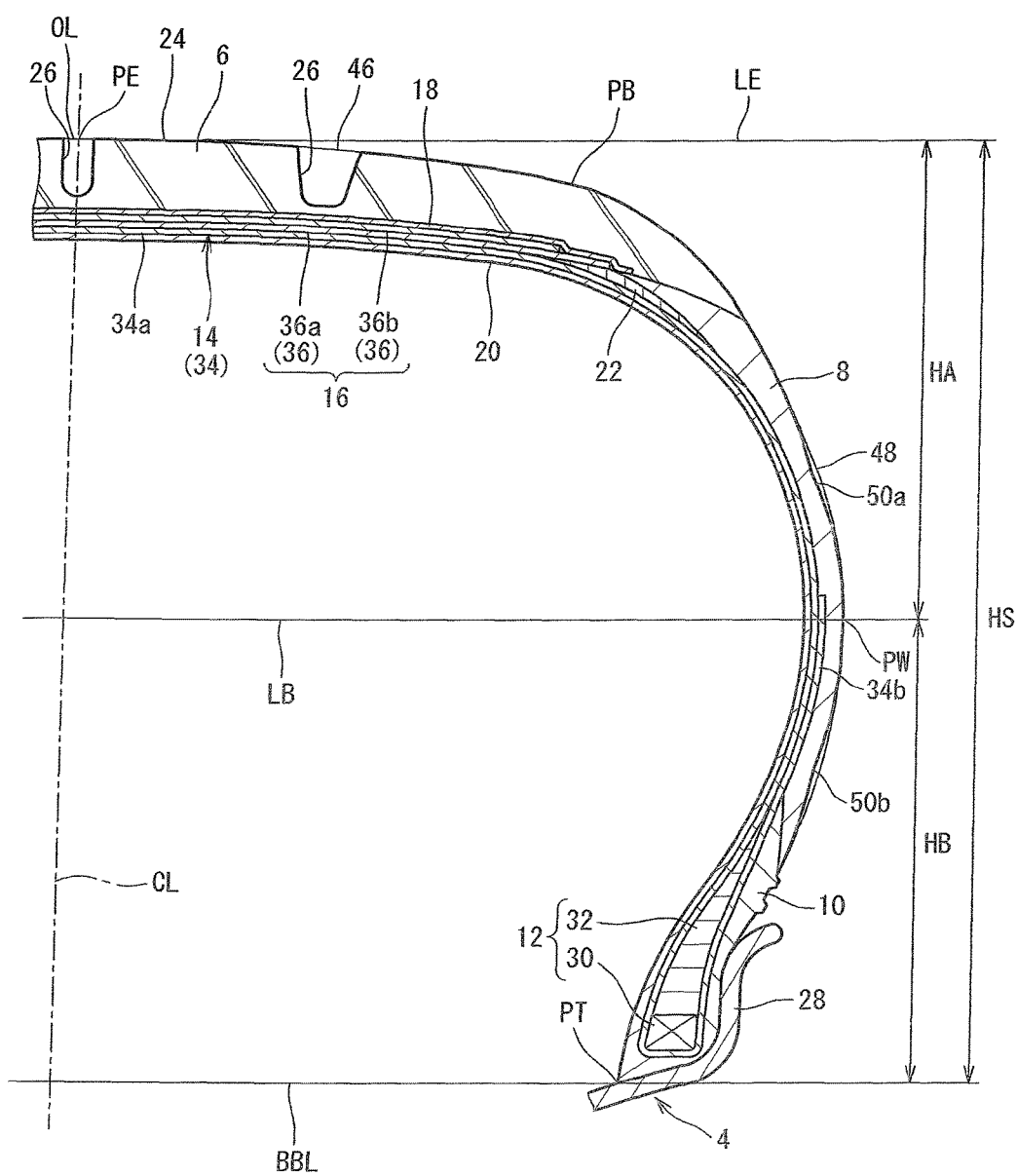
FIG. 1 is a cross-sectional view of a portion of a pneumatic tire according to one embodiment of the present invention.

FIG. 1 illustrates a pneumatic tire 2. In FIG. 1, the up-down direction represents the radial direction of the tire 2, the right-left direction represents the axial direction of the tire 2, and the direction perpendicular to the surface of the sheet represents the circumferential direction of the tire 2. In FIG. 1, an alternate long and short dash line CL represents the equator plane of the tire 2. The tire 2 has a shape which is symmetric about the equator plane except for a tread pattern.

The tire 2 is mounted to a rim 4. The rim 4 is a normal rim. The tire 2 is inflated with air. An internal pressure of the tire 2 is a normal internal pressure. In the present invention, the dimensions and angles of the components of the tire 2 are measured in a state where the tire 2 is mounted to a normal rim, and inflated with air to a normal internal pressure. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

The tire 2 includes a tread 6, sidewalls 8, clinches 10, beads 12, a carcass 14, a belt 16, a band 18, an inner liner 20, and cushion layers 22. The tire 2 is of a tubeless type. The tire 2 is mounted to passenger cars.

The tread 6 has a shape that projects outward in the radial direction. The tread 6 forms a tread surface 24 that can contact with a road surface. The tread surface 24 has grooves 26 formed therein. A tread pattern is formed by the grooves 26. The tread 6 has a base layer and a cap layer, which are not shown. The cap layer is disposed outward of the base layer in the radial direction. The cap layer is layered over the base layer. The base layer is formed of a crosslinked rubber excellent in adhesiveness. A typical base rubber of the base layer is a natural rubber. The cap layer is formed of a crosslinked rubber excellent in wear resistance, heat resistance, and grip performance.

Each sidewall 8 extends almost inward from the end of the tread 6 in the radial direction. The outer ends, in the radial direction, of the sidewalls 8 are joined to the tread 6. The inner ends, in the radial direction, of the sidewalls 8 are jointed to the clinches 10. The sidewalls 8 are formed of a crosslinked rubber excellent in cut resistance and weather resistance. The sidewalls 8 are disposed outward of the carcass 14 in the axial direction. The sidewalls 8 prevent the carcass 14 from being damaged.

Each clinch 10 is disposed inward of the sidewall 8 in the radial direction. Each clinch 10 is disposed outward of the bead 12 and the carcass 14 in the axial direction. The clinches 10 are formed of a crosslinked rubber excellent in wear resistance. The clinches 10 are brought into contact with flanges 28 of the rim 4.

Each bead 12 is disposed inward of the clinch 10 in the axial direction. Each bead 12 includes a core 30, and an apex 32 that extends outward from the core 30 in the radial direction. The core 30 is ring-shaped, and includes a non-stretchable wound wire. A typical material of the wire is a steel. The apex 32 is tapered outward in the radial direction. The apex 32 is formed of a highly hard crosslinked rubber.

The carcass 14 includes a carcass ply 34. The carcass ply 34 is extended on and between the beads 12 on both sides. The carcass ply 34 extends along inner sides of the tread 6 and the sidewalls 8. The carcass ply 34 is turned up around the core 30 from the inner side toward the outer side in the axial direction. By the carcass ply being turned up, the carcass ply 34 includes a main portion 34a and turned-up portions 34b.

The carcass ply 34 is formed of multiple cords aligned with each other, and a topping rubber. An absolute value of an angle of each cord relative to the equator plane ranges from 75° to 90°. In other words, the carcass 14 forms a radial structure. The cords are formed of an organic fiber. Preferable examples of the organic fiber include polyethylene terephthalate fibers, nylon fibers, rayon fibers, polyethylene naphthalate fibers, and aramid fibers. The carcass 14 may include two or more carcass plies 34.

The belt 16 is disposed inward of the tread 6 in the radial direction. The belt 16 and the carcass 14 are layered over each other. The belt 16 reinforces the carcass 14. The width, in the axial direction, of the belt 16 is preferably greater than or equal to 0.7 times the maximum width of the tire 2.

In the tire 2, the belt 16 includes an inner layer 36a and an outer layer 36b. As is apparent from FIG. 1, the outer layer 36b is disposed outward of the inner layer 36a in the radial direction. The width of the outer layer 36b is slightly less than the width of the inner layer 36a in the axial direction. The width, in the axial direction, of the outer layer 36b is generally greater than or equal to 0.85 times the width, in the axial direction, of the inner layer 36a and not greater than 0.95 times the width thereof.

Each of the inner layer 36a and the outer layer 36b includes multiple cords aligned with each other, and a topping rubber, which are not shown. In other words, the belt 16 includes multiple cords aligned with each other. Each cord is tilted relative to the equator plane. An absolute value of the tilt angle is greater than or equal to 10° and not greater than 35° in general. A direction in which the cords of the inner layer 36a are tilted relative to the equator plane is opposite to a direction in which the cords of the outer layer 36b are tilted relative to the equator plane. The material of the cords is preferably a steel. An organic fiber may be used for the cords. The belt 16 may have three or more layers 36.

The band 18 is disposed outward of the belt 16 in the radial direction. The width of the band 18 is greater than the width of the belt 16 in the axial direction. The band 18 includes a cord and a topping rubber, which are not shown. The cord is helically wound. The band 18 has a so-called jointless structure. The cord extends substantially in the circumferential direction. An angle of the cord relative to the circumferential direction is less than or equal to 5°, and more preferably less than or equal to 2°. The belt 16 is held by the cord, thereby reducing lifting of the belt 16. The width, in the axial direction, of the band 18 is preferably greater than or equal to 1.05 times the width, in the axial direction, of the belt, and preferably not greater than 1.10 times the width thereof. The cord is formed of an organic fiber. Preferable examples of the organic fiber include nylon fibers, polyethylene terephthalate fibers, rayon fibers, polyethylene naphthalate fibers, and aramid fibers.

The belt 16 and the band 18 form a reinforcing layer. The reinforcing layer may be formed by the belt 16 only. The reinforcing layer may be formed by the band 18 only.

The inner liner 20 is disposed inward of the carcass 14. The inner liner 20 is joined to the inner surface of the carcass 14. The inner liner 20 is formed of a crosslinked rubber. A rubber excellent in airtightness is used for the inner liner 20. A typical base rubber of the inner liner 20 is isobutylene-isoprene-rubber or halogenated isobutylene-isoprene-rubber. The inner liner 20 maintains internal pressure of the tire 2.

The cushion layers 22 and the carcass 14 are layered over each other near the ends of the belt 16. The cushion layers 22 are formed of a soft crosslinked rubber. The cushion layers 22 absorb stress on the ends of the belt 16. The cushion layers 22 allow reduction of lifting of the belt 16. The cushion layers 22 can contribute to prevention of occurrence of tread loose casing (TLC).

The tire 2 is manufactured in the manner described below. In the method for manufacturing the tire 2, components such as the tread 6 and the sidewalls 8 are combined on a drum of a former, which is not shown. Thus, a raw cover is obtained. The raw cover is an uncrosslinked tire 2. A step of assembling the raw cover is also referred to as a forming step.

The raw cover is placed in a mold. At this time, a bladder is disposed inside the raw cover. When the bladder is filled with gas, the bladder is expanded. Thus, the raw cover is deformed. The mold is closed, and an internal pressure in the bladder is enhanced. A core may be used instead of the bladder. The core has a toroidal outer surface. The outer surface is approximated to a shape of the inner surface of the tire 2 that has been inflated with air and is maintained such that the internal pressure is 5% of a normal internal pressure.

Figure 2:
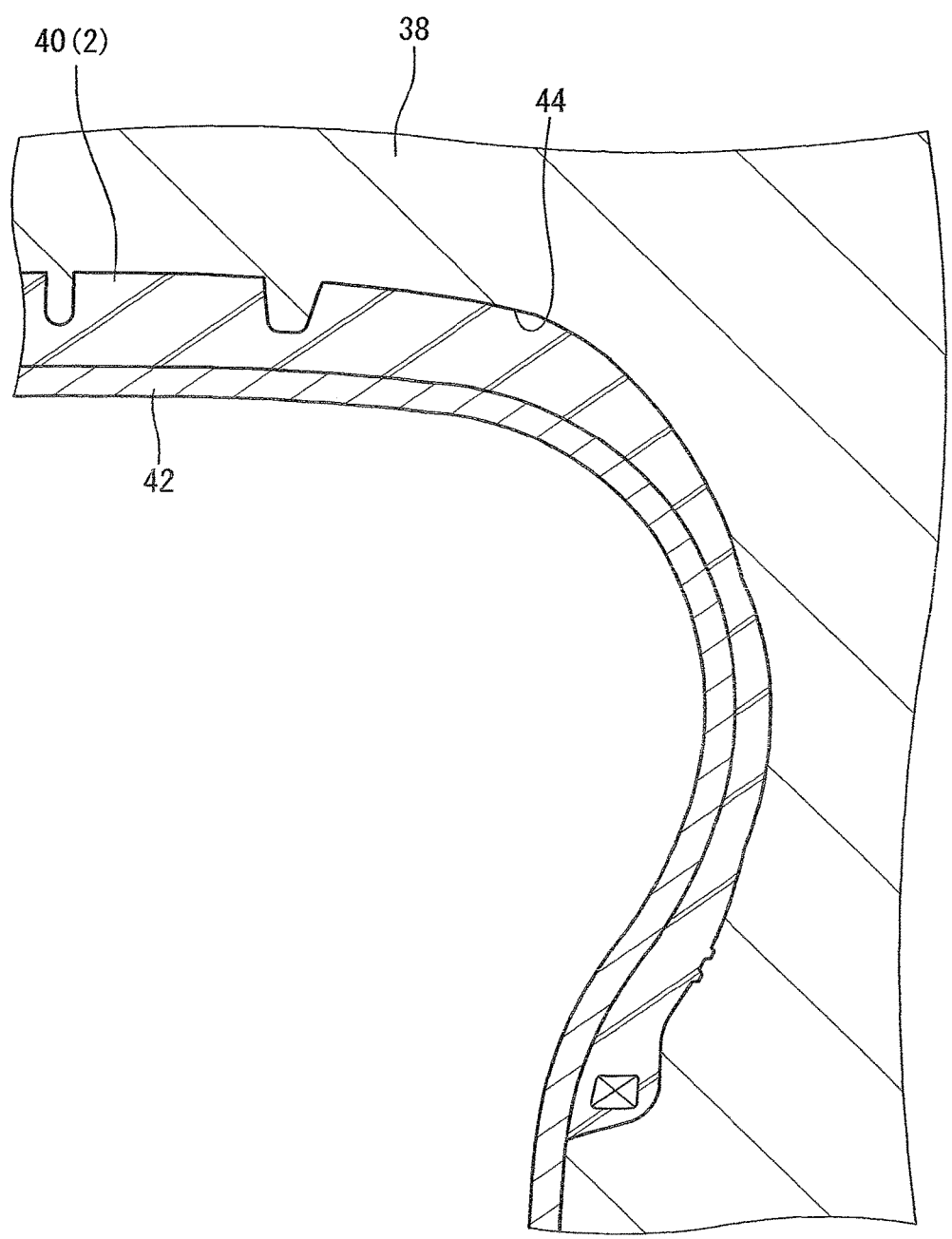
FIG. 2 is a schematic diagram illustrating a state where the tire shown in FIG. 1 is manufactured.

FIG. 2 shows a state where a mold 38 is closed. When the mold 38 has been closed, a raw cover 40 is pressurized between the mold 38 and a bladder 42. The raw cover 40 is heated by heat transfer from the mold 38 and the bladder 42. By the raw cover being pressurized and heated, a rubber composition of the raw cover 40 flows. Crosslinking reaction occurs in the rubber composition due to the heating, to obtain the tire 2 shown in FIG. 1. A step of pressurizing and heating the raw cover 40 is also referred to as a crosslinking step.

In the crosslinking step, the expanded bladder 42 presses the raw cover 40 against a cavity surface 44 of the mold 38. The rubber flows and is pressed onto the cavity surface 44. Thus, the outer surface of the tire 2 is formed. The outer surface includes the grooves 26 of the tread surface 24 described above. In a case where the sidewalls 8 include decorations such as letters and marks, the decorations are also included in the outer surface.

In the present invention, the contour of the outer surface is referred to as a profile. The profile is determined based on dimensions measured in a state where the tire 2 is mounted to a normal rim and inflated with air to a normal internal pressure. In a case where the grooves 26 are formed in the tread surface 24 that forms a portion of the outer surface, the profile is represented by using an imaginary tread surface obtained on the assumption that the grooves 26 are not formed. In a case where the sidewalls 8 include the decorations, the profile is represented by using imaginary outer surfaces of the sidewalls 8 obtained on the assumption the decorations are not formed.

In FIG. 1, the profile of the tire 2 is represented by a solid line OL. The profile OL includes a ground-contact surface 46, and side surfaces 48 that extend almost inward from the ground-contact surface 46 in the radial direction. In FIG. 1, a point PB represents a boundary between the ground-contact surface 46 and each side surface 48. The point PB is represented by the axially outermost end of a portion, of the tire 2, which contacts with a road surface when the tire 2 is inflated to a normal internal pressure and is under a normal load. In the present invention, a zone, in the profile OL, from the point PB (not shown) on the left side to the point PB on the right side is referred to as the ground-contact surface 46.

The tire 2 has a maximum width obtained, in the axial direction, between the side surface 48 on the left side and the side surface 48 on the right side. In other words, the maximum value of a distance, in the axial direction, between both the side surfaces 48 is the maximum width of the tire 2. In FIG. 1, points, on the side surfaces 48, at which the width becomes the maximum width are each represented as a point PW. A solid line LB represents an imaginary straight line that extends through each point PW in the axial direction. In the present invention, the solid line LB is referred to as a first reference line.

In the drawings, reference character PE represents a point of intersection of the ground-contact surface 46 and the equator plane. In the present invention, the point PE of intersection is referred to as the equator. A solid line LE represents an imaginary straight line that extends through the equator PE in the axial direction. The outer diameter of the tire 2 is defined by the solid line LE.

In FIG. 1, a double-headed arrow HA represents a length, in the radial direction, from the first reference line LB to the solid line LE. The length HA represents a length, in the radial direction, from the first reference line LB to the equator PE. In the present invention, the length HA is referred to a first reference length.

In the drawings, a point PT represents a toe of the tire 2. The point PT is also an end point of each side surface 48. A solid line BBL represents an imaginary straight line that extends through each point PT in the axial direction. In the present invention, the solid line BBL is referred to as a second reference line.

In FIG. 1, a double-headed arrow HB represents a length, in the radial direction, from the second reference line BBL to the first reference line LB. The length HB represents a length, in the radial direction, from the second reference line BBL to the point PW. In the present invention, the length HB is referred to as a second reference length.

In FIG. 1, a double-headed arrow HS represents a length, in the radial direction, from the second reference line BBL to the solid line LE. The length HS represents a length, in the radial direction, from the second reference line BBL to the equator PE. The length HS represents a cross-sectional height of the tire 2.

Figure 3:
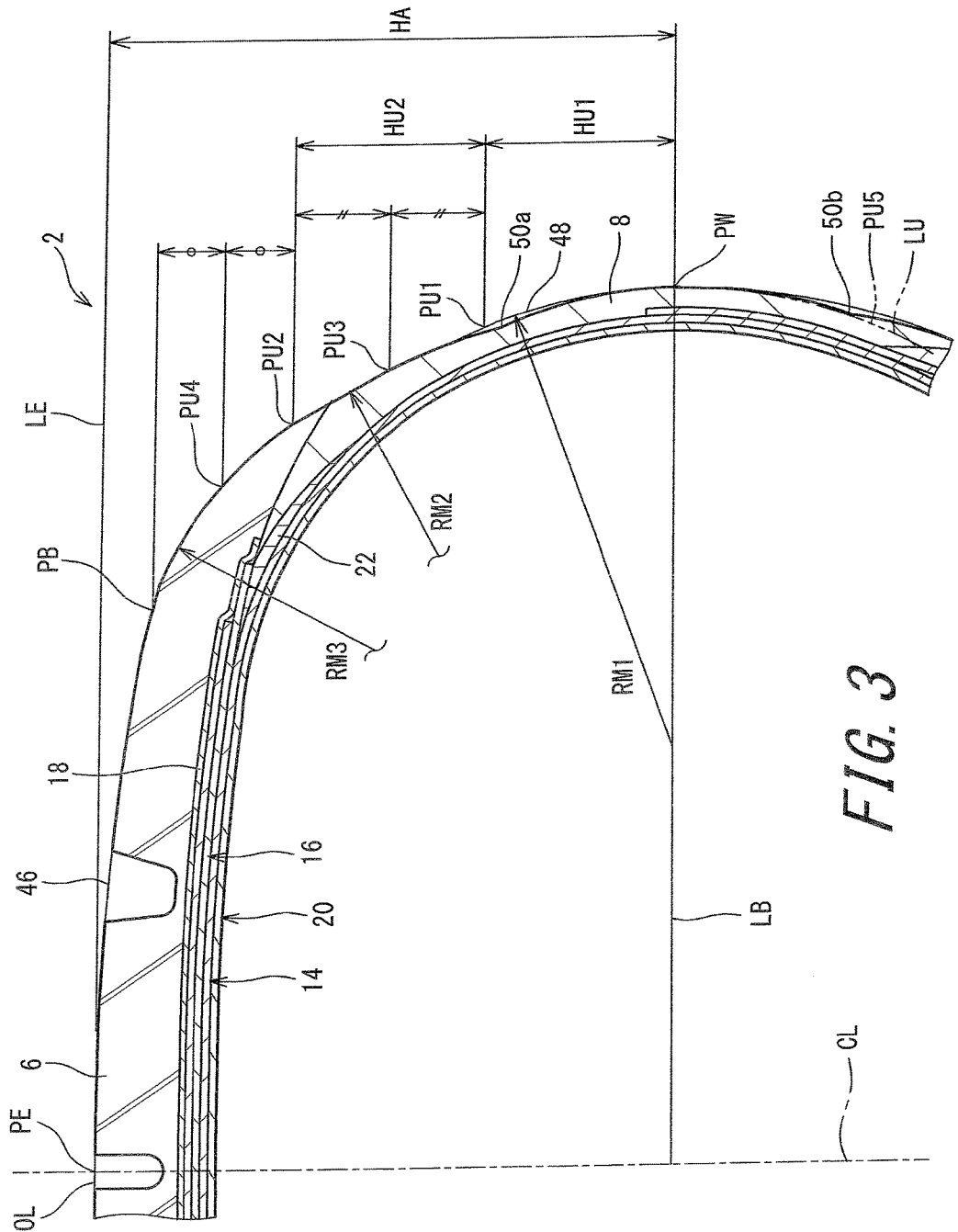
FIG. 3 is an enlarged cross-sectional view of a portion of the tire shown in FIG. 1.

FIG. 3 shows a portion of the tire 2 shown in FIG. 1. In FIG. 3, a point PU1 represents a point, on each side surface 48, positioned outward of the point PW in the radial direction. A double-headed arrow HU1 represents a length, in the radial direction, from the first reference line LB to the point PU1 In the tire 2, the length HU1 is ⅓ of the first reference length HA. The point PU1 is a point, on each side surface 48, which is positioned outward of the point PW in the radial direction, and at which the length from the first reference line LB to the point PU1 in the radial direction corresponds to ⅓ of the first reference length HA.

A point PU2 represents a point, on each side surface 48, positioned outward of the point PU1 in the radial direction. A double-headed arrow HU2 represents a length, in the radial direction, from the point PU1 to the point PU2 In the tire 2, the length HU2 is ⅓ of the first reference length HA. The point PU2 is a point, on each side surface 48, which is positioned outward of the point PU1 in the radial direction, and at which the length from the point PU1 to the point PU2 in the radial direction corresponds to ⅓ of the first reference length HA.

A point PU3 is a point, on each side surface 48, positioned at a mid-position between the point PU2 and the point PU1 in the radial direction. A point PU4 is a point, on each side surface 48, positioned at a mid-position between the point PU2 and the point PB in the radial direction.

In the tire 2, a zone, of each side surface 48 that forms the profile OL of the outer surface, from the point PB to the point PW is formed by three main arcs. The main arcs are a first main arc, a second main arc, and a third main arc.

The first main arc extends almost outward from the point PW in the radial direction. The first main arc extends through the point PW and the point PU1 In FIG. 3, an arrow RM1 represents a radius of curvature of the first main arc.

In FIG. 3, a point PU5 represents an imaginary point positioned such that the imaginary point and the point PU1 are line-symmetric with respect to the first reference line LB. An alternate long and two short dashes line LU represents an extension line from the first main arc. As is apparent from FIG. 3, the extension line LU from the first main arc extends through the imaginary point PU5. As described above, the first main arc extends through the point PW and the point PU1 In the tire 2, the center of the circle including the first main arc is on the first reference line LB.

The second main arc extends almost outward from the first main arc in the radial direction. The second main arc extends through the point PU1, the point PU3, and the point PU2 In FIG. 3, an arrow RM2 represents a radius of curvature of the second main arc. In the tire 2, the center of the circle including the second main arc is on the straight line that extends through the point PU1 and the center of the circle including the first main arc, which is not shown. In other words, the second main arc is tangent to the first main arc at the point PU1 The point PU1 is the tangent point at which the first main arc and the second main arc are tangent to each other. The point PU1 is also a boundary between the first main arc and the second main arc.

The third main arc extends almost outward from the second main arc in the radial direction. The third main arc extends through the point PU2, the point PU4, and the point PB. In FIG. 3, an arrow RM3 represents a radius of curvature of the third main arc. In the tire 2, the center of the circle including the third main arc is on the straight line that extends through the point PU2 and the center of the circle including the second main arc, which is not shown. In other words, the third main arc is tangent to the second main arc at the point PU2 The point PU2 is the tangent point at which the second main arc and the third main arc are tangent to each other. The point P2 is also a boundary between the second main arc and the third main arc.

Figure 4:
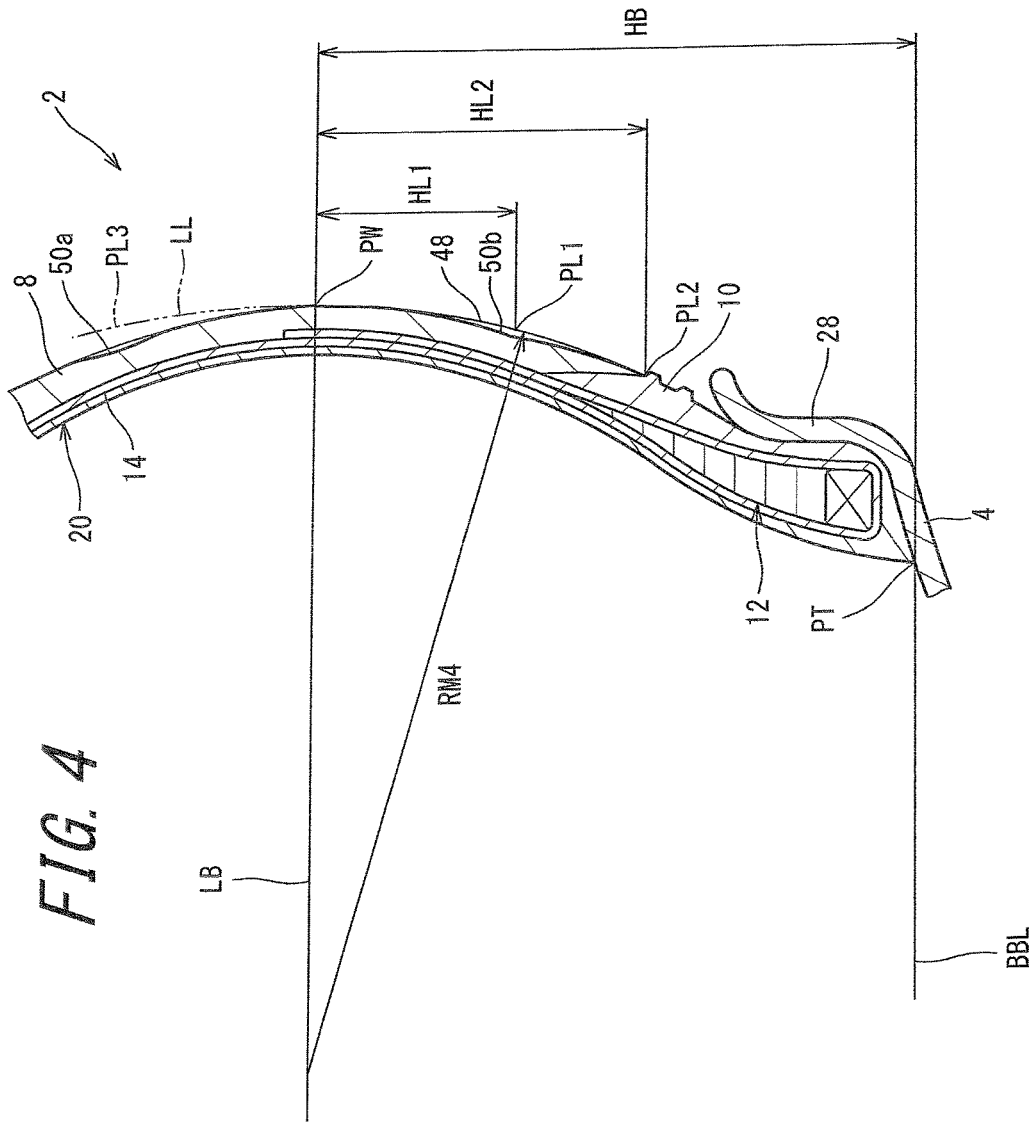
FIG. 4 is an enlarged cross-sectional view of a portion other than the portion shown in FIG. 3.

FIG. 4 shows another portion of the tire 2 shown in FIG. 1. In FIG. 4, a point PL1 is a point, on each side surface 48, positioned inward of the point PW in the radial direction. A double-headed arrow HL1 represents a length, in the radial direction, from the first reference line LB to the point PL1. In the tire 2, the length HL1 is ⅓ of the second reference length HB. The point PL1 is a point, on each side surface 48, which is positioned inward of the point PW in the radial direction, and at which the length from the first reference line LB to the point PL1 in the radial direction corresponds to ⅓ of the second reference length HB.

A point PL2 represents a point, on each side surface 48, positioned inward of the point PL1 in the radial direction. A double-headed arrow HL2 represents a length, in the radial direction, from the first reference line LB to the point PL2. In the tire 2, the length HL2 is 11/20 of the second reference length HB. The point PL2 is a point, on each side surface 48, which is positioned inward of the point PL1 in the radial direction, and at which the length from the first reference line LB to the point PL2 in the radial direction corresponds to 11/20 of the second reference length HB. In the tire 2, the point PL2 is on a boundary between the sidewall 8 and the clinch 10.

In the tire 2, a zone, of each side surface 48 that forms the profile OL of the outer surface, from the point PW to the point PL2 is formed by one main arc. In the present invention, the main arc is referred to as a fourth main arc.

The fourth main arc extends almost inward of the point PW in the radial direction. The fourth main arc extends through the point PW, the point PL1, and the point PL2. In FIG. 4, an arrow RM4 represents a radius of curvature of the fourth main arc.

In FIG. 4, a point PL3 represents an imaginary point positioned such that the imaginary point and the point PL1 are line-symmetric with respect to the first reference line LB. An alternate long and two short dashes line LL represents an extension line from the fourth main arc. As is apparent from FIG. 4, the extension line LL from the fourth main arc extends through the imaginary point PL3. As described above, the fourth main arc extends through the point PW and the point PL1. In the tire 2, the center of the circle including the fourth main arc is on the first reference line LB.

In the tire 2, as shown in FIG. 3, the third main arc and the second main arc are formed between the ground-contact surface 46 and the first main arc. In conventional tires, a ground-contact surface corresponding to the ground-contact surface 46 of the tire 2, and an arc corresponding to the first main arc of the tire 2 are jointed to each other through a straight line. Therefore, in the conventional tires, a portion near a boundary between the arc corresponding to the first main arc, and the straight line is bent so as to be recessed. In the conventional tires, since the bending is specific, energy generated due to deformation cannot be sufficiently absorbed by the bending of the sidewalls. In the conventional tires, reduction of rolling resistance cannot be expected. Meanwhile, in the tire 2 of the present invention, the ground-contact surface 46 is joined to the first main arc through the third main arc and the second main arc, whereby the tire is appropriately bent so as not to be recessed. In the tire 2, energy generated due to deformation is sufficiently absorbed by bending in the range of the sidewalls 8. In the tire 2, rolling resistance is reduced.

The tire 2 in a zone from the point PB to the point PU1, in other words, a portion of the tire 2 from a shoulder to a buttress is bent so as not to be recessed. In the tire 2, bending due to the recess is not generated, thereby preventing increase of rolling resistance due to the bending being repeated. In the tire 2, the rolling resistance is further reduced.

In the tire 2, the profile OL is optimized to achieve reduction of rolling resistance. Therefore, reduction of rolling resistance is achieved without reducing volumes of the tread 6, the sidewalls 8, the belt 16, and the like. According to the present invention, the tire 2 that allows achievement of reduction of the rolling resistance without taking influence on a mass into consideration, can be obtained.

In the tire 2, a ratio of the radius RM2 of curvature of the second main arc to the radius RM1 of curvature of the first main arc is greater than or equal to 1.45 and not greater than 3.26. Since the ratio is set so as to be greater than or equal to 1.45, bending of the sidewalls 8 is appropriately controlled. In the tire 2, the rolling resistance is effectively reduced. Since the ratio is set so as to be not greater than 3.26, the tire 2 in which a distance from the carcass 14 to the profile OL in the zone from the point PB to the point PU1 is appropriate, can be obtained. In the tire 2, the profile OL allows the rolling resistance to be effectively reduced.

In the tire 2, a ratio of the radius RM3 of curvature of the third main arc to the radius RM1 of curvature of the first main arc is greater than or equal to 0.45 and not greater than 0.56. In the tire 2, the shoulders contact with a road surface with a uniform contact pressure. The profile OL can contribute to prevention of generation of uneven wear such as shoulder wear.

From the viewpoint of achieving reduction of rolling resistance without taking influence on a mass into consideration, in a case where, in particular, the size of the tire 2 is represented as 195/65R15, the radius RM2 of curvature of the second main arc is preferably greater than or equal to 80 mm, and preferably not greater than 180 mm. The radius RM3 of curvature of the third main arc is preferably greater than or equal to 25 mm and preferably not greater than 31 mm.

In the tire 2, the radius RM4 of curvature of the fourth main arc is preferably greater than the radius RM1 of curvature of the first main arc. When the tire 2 is mounted to the rim 4, a portion that is inward of the point PW in the radial direction and positioned on the rim 4 side can effectively contribute to supporting of the vehicle body. In this viewpoint, a ratio of the radius RM4 of curvature to the radius RM1 of curvature is preferably greater than 1, and more preferably greater than or equal to 1.30. From the viewpoint of appropriately maintaining bending at the side portions, the ratio is preferably not greater than 1.45.

Figure 5:
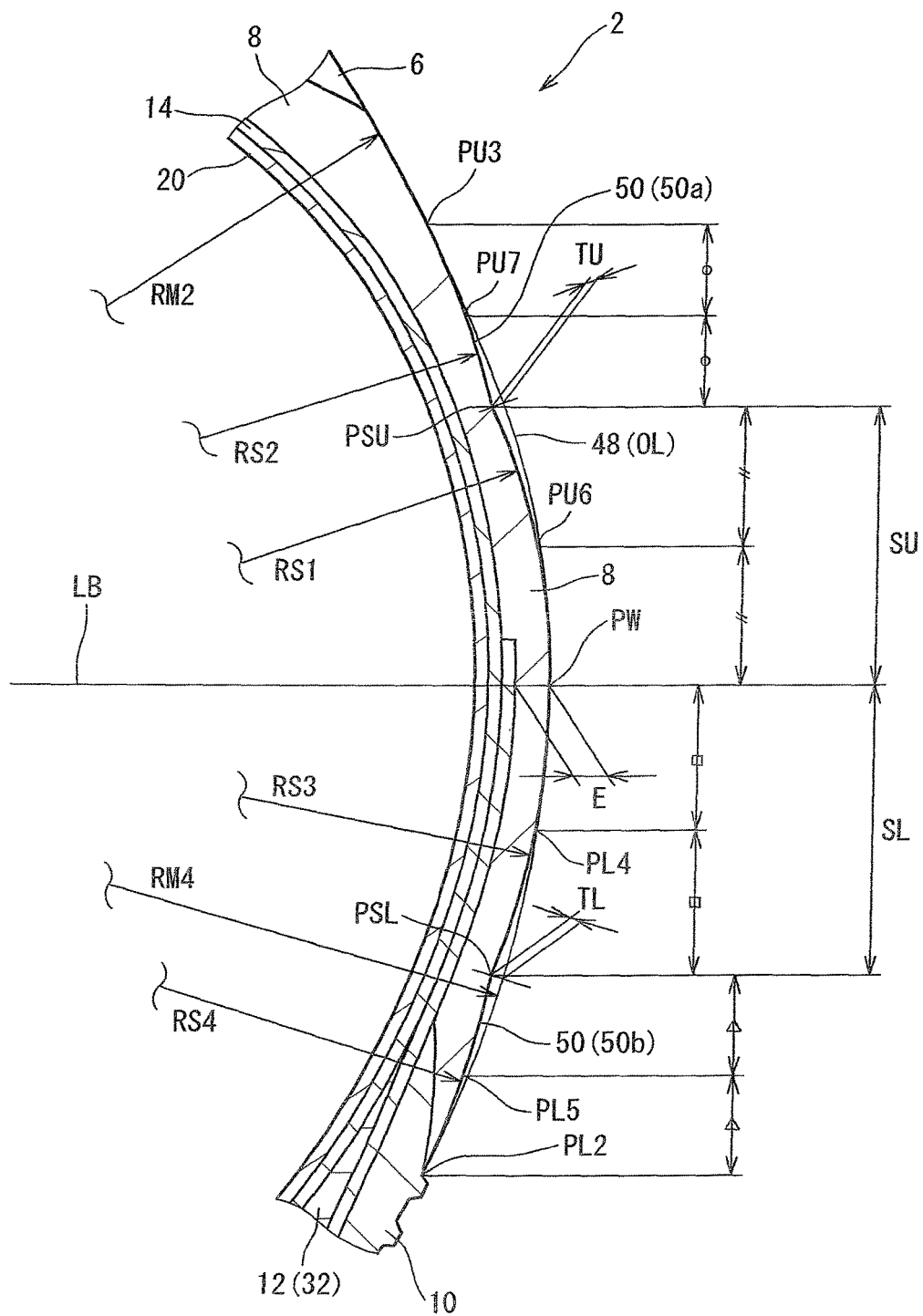
FIG. 5 is an enlarged cross-sectional view of a portion having the maximum width of the tire shown in FIG. 1.

FIG. 5 shows a zone, of the profile OL of the tire 2 shown in FIG. 1, from the point PU3 to the point PL2. As is apparent from FIG. 5, each sidewall 8 of the tire 2 has two recesses 50.

In the tire 2, the two recesses 50 provided in each sidewall 8 are recessed inward from the side surface 48. In the present invention, a recess 50a disposed outward of the point PW in the radial direction is referred to as a first recess. A recess 50b disposed inward of the point PW in the radial direction is referred to as a second recess. In the tire 2, each sidewall 8 includes the first recess 50a and the second recess 50b that are recessed inward from the side surface 48.

In FIG. 5, a point PSU represents the bottom of the first recess 50a. A point PU6 represents a point, on the outer surface of each sidewall 8, which is a mid-position between the point PW and the point PSU in the radial direction. A point PU7 represents a point, on the outer surface of each sidewall 8, which is a mid-position between the point PSU and the point PU3 in the radial direction.

In the tire 2, the contour of the first recess 50a is formed by two secondary arcs. These secondary arcs are a first secondary arc and a second secondary arc.

The first secondary arc extends almost outward from the point PW in the radial direction. The first secondary arc extends through the point PW, the point PU6, and the point PSU. In FIG. 5, an arrow RS1 represents a radius of curvature of the first secondary arc. In the tire 2, the center of the circle including the first secondary arc is on the first reference line LB, which is not shown. The first secondary arc is tangent to the first main arc at the point PW.

The second secondary arc extends almost outward from the first secondary arc in the radial direction. The second secondary arc extends through the point PSU, the point PU7, and the point PU3 In FIG. 5, an arrow RS2 represents a radius of curvature of the second secondary arc. In the tire 2, the center of the circle including the second secondary arc is on the straight line that extends through the point PU3 and the center of the circle including the second main arc, which is not shown. In other words, the second secondary arc is tangent to the second main arc at the point PU3 The point PU3 is a tangent point at which the second secondary arc and the second main arc are tangent to each other. The point PU3 also represents a boundary between the second secondary arc and the second main arc.

In the tire 2, the center of the circle including the first secondary arc is not on the straight line that extends through the point PSU and the center of the circle including the second secondary arc. The center of the circle including the second secondary arc is not on the straight line that extends through the point PSU and the center of the circle including the first secondary arc. In the tire 2, the first secondary arc and the second secondary arc are not tangent to each other at the point PSU. The arc representing the first secondary arc and the arc representing the second secondary arc intersect each other at the point PSU. The point PSU is a boundary between the first secondary arc and the second secondary arc. However, the point PSU is not the tangent point thereof.

In FIG. 5, a point PSL represents the bottom of the second recess 50b. A point PL4 represents a point, on the outer surface of each sidewall 8, which is a mid-position between the point PW and the point PSL in the radial direction. A point PL5 represents a point, on the outer surface of each sidewall 8, which is a mid-position between the point PSL and the point PL2 in the radial direction.

In the tire 2, the contour of the second recess 50b is formed by two secondary arcs. These secondary arcs are a third secondary arc and a fourth secondary arc.

The third secondary arc extends almost inward from the point PW in the radial direction. The third secondary arc extends through the point PW, the point PL4, and the point PSL. In FIG. 5, an arrow RS3 represents a radius of curvature of the third secondary arc. In the tire 2, the center of the circle including the third secondary arc is on the first reference line LB, which is not shown. The third secondary arc is tangent to the first main arc at the point PW.

The fourth secondary arc extends almost inward from the third secondary arc in the radial direction. The fourth secondary arc extends through the point PSL, the point PL5, and the point PL2 . In FIG. 5, an arrow RS4 represents a radius of curvature of the fourth secondary arc. In the tire 2, the center of the circle including the fourth secondary arc is on the straight line that extends through the point PL2 and the center of the circle including the fourth main arc, which is not shown. In other words, the fourth secondary arc is tangent to the fourth main arc at the point PL2 . The point PL2 is a tangent point at which the fourth secondary arc and the fourth main arc are tangent to each other.

In the tire 2, the center of the circle including the third secondary arc is not on the straight line that extends through the point PSL and the center of the circle including the fourth secondary arc. The center of the circle including the fourth secondary arc is not on the straight line that extends through the point PSL and the center of the circle including the third secondary arc.

In the tire 2, the third secondary arc and the fourth secondary arc are not tangent to each other at the point PSL. The arc representing the third secondary arc and the arc representing the fourth secondary arc intersect each other at the point PSL. The point PSL is a boundary between the third secondary arc and the fourth secondary arc. However, the point PSL is not the tangent point thereof.

In FIG. 5, a double-headed arrow E represents a thickness of each sidewall 8 at the point PW. The thickness E is also referred to as a reference thickness. The reference thickness E is represented as a length, from the outer surface of the carcass 14 to the point PW, which is measured along the first reference line LB. A double-headed arrow SU represents a length, in the radial direction, from the first reference line LB to the point PSU that is the bottom of the first recess 50a. A double-headed arrow SL represents a length, in the radial direction, from the first reference line LB to the point PSL that is the bottom of the second recess 50b. A double-headed arrow TU represents the depth of the first recess 50a. The depth TU is represented as a length from the side surface 48 to the point PSU. A double-headed arrow TL represents the depth of the second recess 50b. The depth TL is represented as a length from the side surface 48 to the point PSL.

In the tire 2, the first recess 50a is provided outward of the point PW in the radial direction. The first recess 50a can contribute to bending in a region of each sidewall 8 (hereinafter, referred to as a side portion) of the tire 2. As described below, in the tire 2, the position and the depth of the first recess 50a are appropriately adjusted. In the tire 2, movement of the tread 6 is effectively reduced, and the side portion is bent mainly near the maximum with portion. Thus, energy generated due to deformation is sufficiently absorbed. Therefore, rolling resistance of the tire 2 is sufficiently reduced as compared to a tire which is not provided with the first recess 50a. In the present invention, the tire 2 that allows achievement of reduction of rolling resistance without taking influence on a mass into consideration, can be obtained.

In the tire 2, a ratio of the length SU in the radial direction to the cross-sectional height HS is greater than or equal to 0.08 and not greater than 0.24. Thus, the first recess 50a is disposed at an appropriate position. The side portion is bent near the maximum width portion, whereby rolling resistance of the tire 2 is sufficiently reduced as compared to conventional tires.

In the tire 2, a ratio of the depth TU to the reference thickness E is greater than or equal to 0.16 and not greater than 0.48. When the ratio is set so as to be greater than or equal to 0.16, the first recess 50a can effectively contribute to bending. When the ratio is set so as to be not greater than 0.48, poor outer appearance such as bulge, dent, or the like is prevented, and impact resistance is appropriately maintained.

In the tire 2, from the viewpoint that the first recess 50a can be formed at an appropriate position so as to have an appropriate shape, a ratio of the radius RS1 of curvature of the first secondary arc to the radius RM1 of curvature of the first main arc is preferably greater than or equal to 0.45, and preferably not greater than 1.18. From the same viewpoint, a ratio of the radius RS2 of curvature of the second secondary arc to the radius RM1 of curvature of the first main arc is preferably greater than or equal to 0.63, and preferably not greater than 1.54.

From the viewpoint of achieving reduction of rolling resistance without taking influence on a mass into consideration, in a case where, in particular, the size of the tire 2 is represented as 195/65R15, the height SU in the radial direction is preferably greater than or equal to 10 mm, and preferably not greater than 30 mm. The depth TU is preferably greater than or equal to 0.4 mm, and preferably not greater than 1.2 mm. From the viewpoint that the tire 2 can be obtained such that the height SU in the radial direction is greater than or equal to 10 mm and not greater than 30 mm, and the depth TU is greater than or equal to 0.4 mm and not greater than 1.2 mm, the radius RS1 of curvature of the first secondary arc is preferably greater than or equal to 25 mm, and preferably not greater than 65 mm. The radius RS2 of curvature of the second secondary arc is preferably greater than or equal to 35 mm, and preferably not greater than 85 mm.

In the tire 2, the second recess 50*b* is provided inward of the point PW in the radial direction. The second recess 50*b* can contribute to bending of the side portion. As described below, in the tire 2, the position and the depth of the second recess 50*b* are appropriately adjusted. In the tire 2, movement of the tread 6 is effectively reduced, and the side portion is bent mainly near the maximum width portion. Thus, energy generated due to deformation is sufficiently absorbed. Therefore, rolling resistance of the tire 2 is sufficiently reduced as compared to a tire which is not provided with the second recess 50*b*. In the present invention, the tire 2 that allows achievement of reduction of rolling resistance without taking influence on a mass into consideration, can be obtained.

In the tire 2, a ratio of the length SL in the radial direction to the cross-sectional height HS is greater than or equal to 0.08 and not greater than 0.24. Thus, the second recess 50*b* is positioned at an appropriate position. The side portion is bent near the maximum width portion, whereby rolling resistance of the tire 2 is sufficiently reduced as compared to conventional tires.

In the tire 2, a ratio of the depth TL to the reference thickness E is greater than or equal to 0.16 and not greater than 0.48. When the ratio is set so as to be greater than or equal to 0.16, the second recess 50*b* can effectively contribute to bending. When the ratio is set so as to be not greater than 0.48, poor outer appearance such as bulge, dent, or the like is prevented, and impact resistance is appropriately maintained.

In the tire 2, from the viewpoint that the second recess 50*b* can be formed at an appropriate position so as to have an appropriate shape, a ratio of the radius RS3 of curvature of the third secondary arc to the radius RM4 of curvature of the fourth main arc is preferably greater than or equal to 0.39, and preferably not greater than 0.91. From the same viewpoint, a ratio of the radius RS4 of curvature of the fourth secondary arc to the radius RM4 of curvature of the fourth main arc is preferably greater than or equal to 0.65, and preferably not greater than 1.95.

From the viewpoint of achieving reduction of rolling resistance without taking influence on a mass into consideration, in a case where, in particular, the size of the tire 2 is represented as 195/65R15, the height SL in the radial direction is preferably greater than or equal to 10 mm, and preferably not greater than 30 mm. The depth TL is preferably greater than or equal to 0.4 mm, and preferably not greater than 1.2 mm. From the viewpoint that the tire 2 can be obtained such that the height SL in the radial direction is greater than or equal to 10 mm and not greater than 30 mm, and the depth TL is greater than or equal to 0.4 mm and not greater than 1.2 mm, the radius RS3 of curvature of the third secondary arc is preferably greater than or equal to 30 mm, and preferably not greater than 70 mm. The radius RS4 of curvature of the fourth secondary arc is preferably greater than or equal to 50 mm, and preferably not greater than 150 mm.

In the tire 2, the length SU in the radial direction and the length SL in the radial direction are preferably equal to each other. Thus, the position of the first recess 50*a* relative to the first reference line LB, and the position of the second recess 50*b* relative to the first reference line LB become similar. In the tire 2, the side portion is bent mainly near the maximum width portion. Movement of the tread 6 is effectively reduced. Rolling resistance of the tire 2 is substantially reduced. According to the present invention, the tire 2 that allows achievement of reduction of rolling resistance without taking influence on a mass into consideration, can be obtained.

In the tire 2, the depth TU and the depth TL are preferably equal to each other. In the tire 2, a degree of bending caused by the first recess 50*a* and a degree of bending caused by the second recess 50*b* become almost equal to each other. In the tire 2, the side portion is bent mainly near the maximum width portion. Movement of the tread 6 is effectively reduced. Rolling resistance of the tire 2 is substantially reduced. According to the present invention, the tire 2 that allows achievement of reduction of rolling resistance without taking influence on a mass into consideration, can be obtained.

[Second Embodiment]

Figure 6:
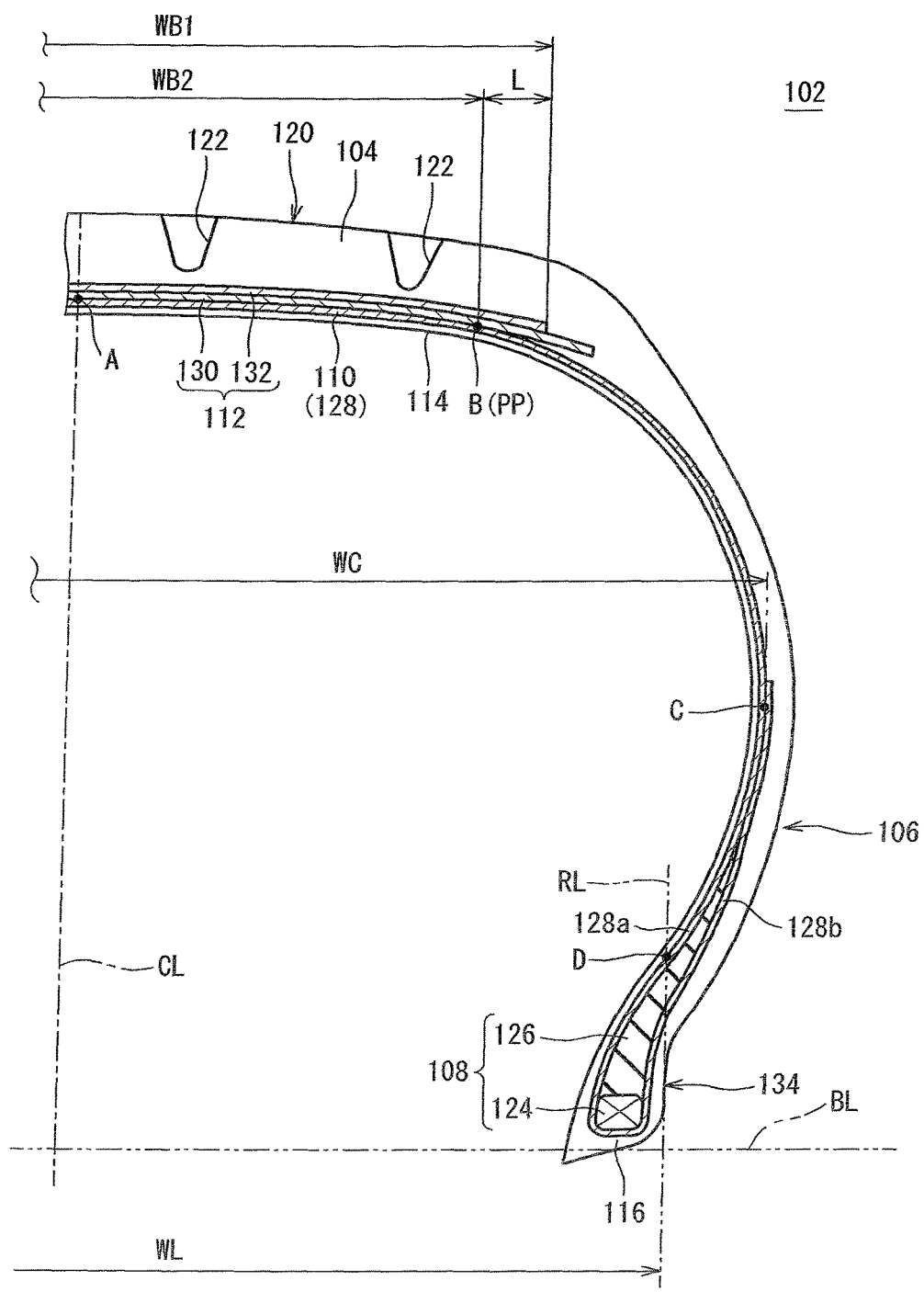
FIG. 6 is a cross-sectional view, taken so as to be perpendicular to the tire circumferential direction, illustrating an example of a tire to which a method for determining a carcass profile according to another embodiment of the present invention can be applied.
Figure 7:
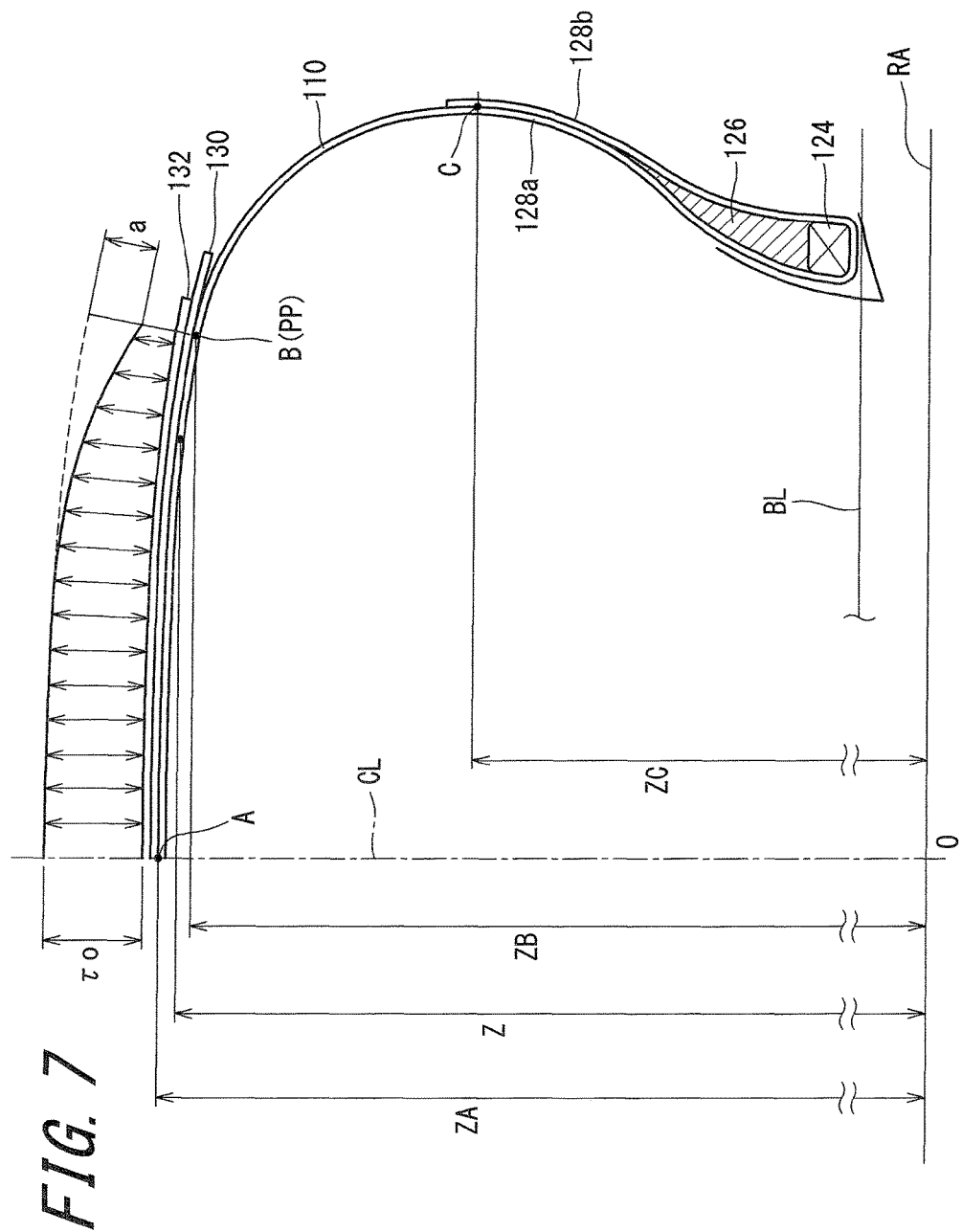
FIG. 7 is a schematic cross-sectional view illustrating a tire internal pressure share ratio of a belt of the tire shown in FIG. 6.

FIG. 6 shows a pneumatic tire 102 to which a method for determining a carcass profile according to one embodiment of the present invention can be applied. In FIG. 6, the up-down direction represents the tire radial direction (hereinafter, also referred to simply as the radial direction), the right-left direction represents the tire axial direction (hereinafter, also referred to simply as the axial direction), and the direction perpendicular to the surface of the sheet represents the tire circumferential direction (hereinafter, also referred to simply as the circumferential direction). In FIG. 6, an alternate long and short dash line CL represents the center line of the meridian cross-section of the tire 102, and also represents the equator plane. The tire 102 has a shape which is symmetric about the equator plane except for a tread pattern. An alternate long and two short dashes line BL represents a bead base line of the tire 102. The tire 102 includes a tread 104, sidewalls 106, beads 108, a carcass 110, a belt 112, an inner liner 114, and chafers 116. The tire 102 is of a tubeless type. The tire 102 can be mounted to passenger cars.

The tread 104 has a shape that projects outward in the radial direction. The tread 104 forms a tread surface 120 that can contact with a road surface. The tread surface 120 has grooves 122 formed therein. The tread pattern is formed by the grooves 122.

Each sidewall 106 extends almost inward from the end of the tread 104 in the radial direction. The outer ends, in the radial direction, of the sidewalls 106 are jointed to the tread 104. The sidewalls 106 are formed of a crosslinked rubber excellent in cut resistance and weather resistance. The sidewalls 106 prevent the carcass 110 from being damaged.

Each bead 108 is disposed inward of the sidewall 106 in the radial direction. Each bead 108 includes a core 124, and an apex 126 that extends outward from the core 124 in the radial direction. The core 124 is ring-shaped, and includes a non-stretchable wound wire. A typical material of the wire is a steel. The apex 126 is tapered outward in the radial direction. The apex 126 is formed of a highly hard cross-linked rubber.

The carcass 110 includes a carcass ply 128. The carcass ply 128 is extended, along the tread 104 and the sidewalls 106, on and between the beads 108 on both sides. The carcass ply 128 is turned up around the core 124 from the inner side toward the outer side in the axial direction. By the carcass ply being turned up, the carcass ply 128 includes a main portion 128a and turned-up portions 128b.

The carcass ply 128 is formed of multiple cords aligned with each other, and a topping rubber. An absolute value of an angle of each cord relative to the equator plane ranges from 75° to 90°. In other words, the carcass 110 forms a radial structure. The cords are formed of an organic fiber. Preferable examples of the organic fiber include polyester fibers, nylon fibers, rayon fibers, polyethylene naphthalate fibers, and aramid fibers. The carcass 110 may include two or more plies.

The belt 112 is disposed inward of the tread 104 in the radial direction. The belt 112 and the carcass 110 are layered over each other. The belt 112 reinforces the carcass 110. The belt 112 includes an inner belt layer 130, and an outer belt layer 132 that is layered outward of the inner belt layer 130 in the radial direction. As is apparent from FIG. 6, the width of the inner belt layer 130 is slightly greater than the width of the outer belt layer 132 in the axial direction. Each of the inner belt layer 130 and the outer belt layer 132 includes multiple cords aligned with each other, and a topping rubber, which are not shown. Each cord is tilted relative to the equator plane. An absolute value of the tilt angle is greater than or equal to 10° and not greater than 35° in general. A direction in which the cords of the inner belt layer 130 are tilted relative to the equator plane is opposite to a direction in which the cords of the outer belt layer 132 are tilted relative to the equator plane. The material of the cords is preferably a steel. An organic fiber may be used for the cords.

The inner liner 114 is disposed inward of the carcass 110. The inner liner 114 is formed of a crosslinked rubber. A rubber excellent in airtightness is used for the inner liner 114. A typical base rubber of the inner liner 114 is isobutylene-isoprene-rubber or halogenated isobutylene-isoprene-rubber. The inner liner 114 maintains internal pressure of the tire.

Each chafer 116 is disposed near the bead 108. When the tire 102 is mounted to a rim, the chafer 116 contacts with the rim. Portions near the beads 108 are protected due to the contact. For example, the chafers 116 may be formed of a fabric and a rubber impregnated into the fabric.

In FIG. 6, a double-headed arrow WC represents the maximum width of the carcass 110. The maximum width WC of the carcass 110 is measured as a distance in a straight line in the axial direction. The maximum width WC is measured as a distance from the center of the thickness of the carcass 110 to the center of the thickness thereof.

In FIG. 6, a double-headed arrow WB1 represents the width of the outer belt layer 132. A double-headed arrow WB2 represents the width of a portion in which the belt 112 that includes both the inner side layer 130 and the outer side layer 132, and the carcass 110 overlap each other without separating from each other. Specifically, both ends of the double-headed arrow WB2 each represent a separation start point PP at which the inner belt layer 130 and the carcass 110 separate from each other. The widths WB1 and WB2 are each measured as a distance in a straight line in the axial direction of the tire 102.

In FIG. 6, a double-headed arrow WL represents a clip width of the tire 102. The clip width WL is measured as a distance in a straight line in the axial direction. In general, the clip width WL is designed so as to be larger than the width (reference rim width) of a normal rim which is defined in the standard. This is because the tire shrinks after vulcanization. However, if the clip width WL is excessively larger than the reference rim width, compressive strain is already generated in bead portions when the tire is mounted to the rim. Therefore, increase of compressive strain under a load may not be endured. If the clip width WL is excessively less than the normal rim width, the bead portions tend to stand (along the tire radial direction) when the tire is mounted to the rim and inflated.

In the description herein, the normal rim represents a rim that is specified according to the standard with which the tire complies. The "standard rim" in the JATMA standard, the "Design Rim" in the TRA standard, and the "Measuring Rim" in the ETRTO standard are included in the normal rim.

A method for determining a profile of the carcass 110, which is an important process in the designing of the tire 102, will be described below. In the description here, a method for determining a carcass profile in order to extend a series of tire widths (nominal widths of tire) for the same aspect ratio, will be described.

For determining a carcass profile, the natural equilibrium shape theory is applied such that the shape changes so as to have similar shapes according to change of tire internal pressure. The carcass profile based on the natural equilibrium shape theory represents an equilibrium shape of the carcass which is formed such that, when the tire is inflated to a normal internal pressure, a tensile force of the carcass balances with a tire internal pressure and a reaction force from the belt 112 in a case where forces other than the tire internal pressure and the reaction force from the belt 112 are not applied. In the description herein, the normal internal pressure represents an internal pressure that is specified according to the standard with which the tire complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

According to the natural equilibrium shape theory, a tensile force uniformly acts in the carcass cords. Therefore, on the assumption that the carcass cords are elongated, the carcass profile based on the theory can be almost uniformly deformed so as to have shapes similar to the original shape. As a result, an amount of deformation is reduced. Many theoretical expressions for setting the carcass line having the natural equilibrium shape are known. In the present embodiment, a manner that is introduced in "TAIYA KOGAKU (Tire engineering)" by Hideo Sakai, is adopted.

Firstly, a carcass profile of a tire having one representative tire width, among tires for one aspect ratio, is obtained by applying the natural equilibrium shape theory. The carcass profile is obtained on the cross-section (hereinafter, also referred to as the meridian cross-section) perpendicular to the tire circumferential direction. A preferable tire internal pressure share ratio $\tau_0$ of the belt 112 on the center line CL and a reduced amount a thereof for the tire having this aspect ratio are selected. Simultaneously, four specific points (A, B, C, D) for the tire, having another tire width, for which the carcass profile is to be determined, are set on the carcass line, having the natural equilibrium shape, of the representative tire width. For example, when at least three points among the four specific points (A, B, C, D), and the above-described τo and a, which are associated with the natural equilibrium shape theory, are defined, the carcass profile having the natural equilibrium shape is quantitatively defined.

Positions of the four specific points (A, B, C, D) are shown in FIG. 7, FIG. 9, FIG. 10, and FIG. 11. The point A represents a position of the point of intersection of the carcass 110 and the center line (the equator plane) CL. The point B represents a position of the separation start point PP at which the carcass 110 and the belt 112 separate from each other. The point C represents a position of each end portion of the maximum width of the carcass 110. The point D represents a position of the point of intersection of: the carcass line CCL defined by the three points (A, B, C); and a straight line RL, in the radial direction, which extends through a bead heel 134 that is each end of the clip width WL.

In the tread portion of the tire 102, the belt 112 is layered over the carcass 110. Only in this layered portion in the region between the point A and the point D, both the carcass 110 and the belt 112 share the tire internal pressure, whereby a tensile force is generated in the belt 112. According to the natural equilibrium shape theory, an internal pressure share ratio Tb of the belt 112 is represented, by the following equation (1), as a function of a position Z, on the Z-axis, for the corresponding position. In a coordinate system in which Z, ZA, and ZB are defined, in plane coordinates on the meridian cross-section, the originating point is a point of intersection of the tire rotation axis (tire center axis) RA and the tire center line (equator plane) CL, the Y-axis is represented by the tire rotation axis direction, and the Z-axis is represented by the tire radial direction.

$$Tb = \tau o - a\{(ZA-Z)/(ZA-ZB)\} \quad (1)$$

In the mathematical expression (1), τO represents a tire internal pressure share ratio of the belt 112 on the center line CL. a represents a reduced amount of the tire internal pressure share ratio τo at the separation start point PP where the belt 112 separates from the carcass 110. ZA represents a position, on the Z-axis, of the point A. ZB represents a position, on the Z-axis, of the point B. Both τo and a described above can be optionally determined based on the belt 112 to be used.

In this case, according to the condition for a balance between a tensile force tc that acts in the cords of the carcass 110 and the tire internal pressure p, a radius z of the circle in which the center position is on the tire rotation axis RA; and a radius Rs of curvature, on the cross-section, at a point that is distance from the tire rotation axis RA by the radius z satisfy the following mathematical expression (2). N represents the number of cords included in the carcass ply 128 as described in paragraph [0052] of JP08-142601.

$$N \cdot tc/2\pi \cdot z = p \cdot Tc \cdot Rs \quad (2)$$

wherein Tc represents a tire internal pressure share ratio of the carcass 110. Tc=1−Tb is satisfied in the layered region, between the point A and the point B, in which the carcass 110 and the belt 112 are layered. Tc=1 is satisfied in a region, between the point B and the point D, in which the belt 112 and the like are not layered over the carcass 110.

Rs in the mathematical expression (2) is represented by the following mathematical expression (3) that is a geometric relational expression.

$$1/Rs = y''/(1+y'^2)^{3/2} \quad (3)$$

The mathematical expression (3) and the internal pressure share ratio Tc of the carcass 110 described above, are substituted into the mathematical expression (2), and integration is performed, to obtain the carcass profile according to the following mathematical expressions (4) and (5).

The shape of the carcass 110 in the layered region (between the point A and the point B) in which the carcass 110 and the inner belt layer 130 in the tread 104 are layered, is obtained by the following mathematical expression (4).

$$y = -\int G_1(z)dz \quad (4)$$

The shape of the carcass 110 in a portion (between the point B and the point D) of each sidewall 106 is obtained by the following mathematical expression (5).

$$y = -\int G_1(z)dz - \int G_2(z)dz \quad (5)$$

$G_1(z)$ and $G_2(z)$ are each a function of Z, and $G_1(z)$ is represented by the following mathematical expression (6) and $G_2(z)$ is represented by the following mathematical expression (7).

$$G_1(z) = [ZB^2 - ZC^2 + \{1 - \tau o + aZA/(ZA-ZB)\}(Z^2 - ZB^2) - 2a(Z^3 - ZB^3)/3(ZA-ZB)] \times [B^2 - \{ZB^2 - ZC^2 + \{1 - \tau o + aZA/(ZA-ZB)\}(Z^2 - ZB^2) - 2a(Z^3 - ZB^3)/3(ZA-ZB)\}^2]^{-1/2} \quad (6)$$

$$G_2(z) = (Z^2 - ZC^2)\{B^2 - (Z^2 - ZC^2)^2\}^{-1/2} \quad (7)$$

B is represented by the following mathematical expression (8).

$$B = ZB^2 - ZC^2 + \{1 - \tau o + aZA/(ZA-ZB)\}(ZA^2 - ZB^2) - 2a(ZA^3 - ZB^3)/3(ZA-ZB) \quad (8)$$

τo, a, ZA, and ZB are as described above. ZC represents a position, on the Z-axis, of the point C.

τo, a, ZA, ZB, and ZC are assigned to the mathematical expressions (1) to (8) as appropriate, and calculation is sequentially performed, whereby the carcass profile having the natural equilibrium shape can be determined for each tire width. Values of τo, a, ZA, ZB, and ZC described above are selected as described below.

Figure 8:
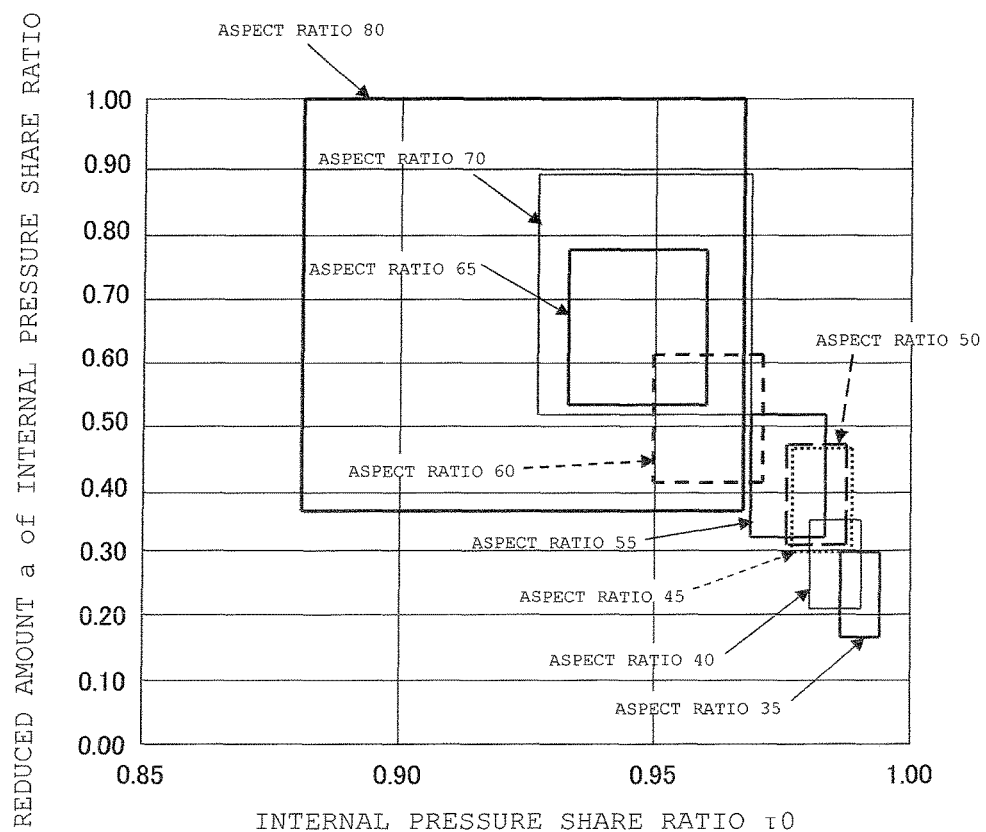
FIG. 8 shows a graph representing, for each aspect ratio of the tire shown in FIG. 2, a preferable range for a tire internal pressure share ratio τo of the belt at an point (point A) of intersection of the equator plane and a carcass, and a preferable range for a reduced amount a of the tire internal pressure share ratio τo at a separation start point (point B) at which the belt separates from the carcass.
Figure 9:
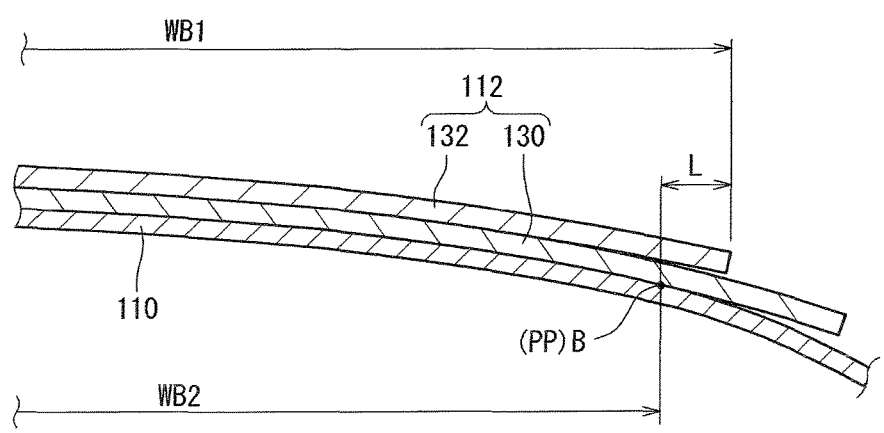
FIG. 9 is an enlarged cross-sectional view of a portion of the tire shown in FIG. 6, illustrating the separation start point (point B) at which the carcass and the belt separate from each other in the tire shown in FIG. 6.
Figure 10:
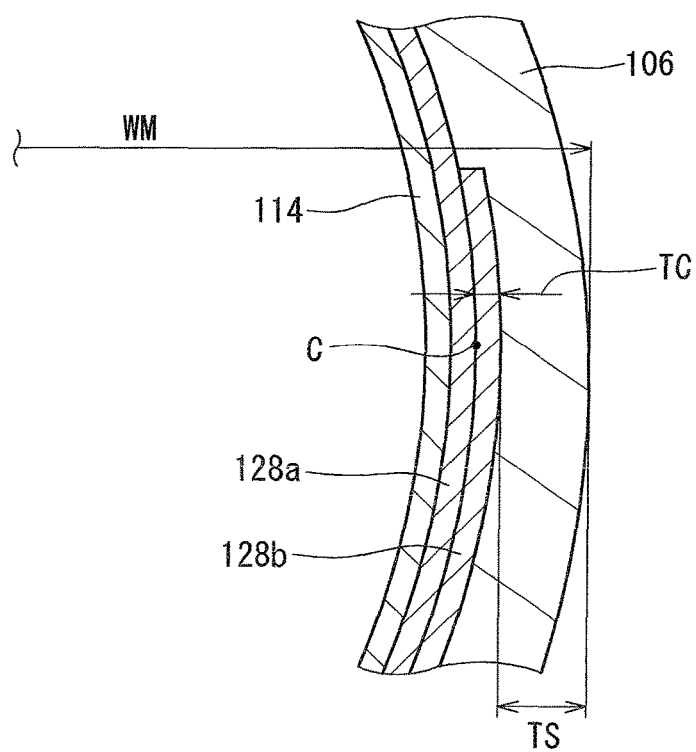
FIG. 10 is an enlarged cross-sectional view of a portion of the tire shown in FIG. 6, illustrating a point (point C) at the carcass maximum width position of the tire shown in FIG. 6.

As indicated in Table 1 and FIG. 8, in the present embodiment, preferable numerical value ranges for TO and a are defined for each of plural predetermined aspect ratios (80, 70, 65, 60, 55, 50, 45, 40, 35) of the tire. The preferable ranges for the numerical values of τo and a are defined for each of the aspect ratios of 80 to 35 regardless of the tire width. τo and a are preferably selected from the ranges indicated in Table 1. By the numerical values of τo and a being selected and determined, a distribution of the tire internal pressure share ratio of the belt 112 between the point A and the point B is determined, and the carcass profile and the profile of the belt along the carcass are determined. The ranges of the numerical values indicated in Table 1 and FIG. 8 are defined, by using the finite element method, as ranges of numerical values that allow appropriate ground-contact shape and contact pressure distribution, and uniformity of the protrusion of the profile to be obtained. As is apparent from Table 1, the less the aspect ratio is, the greater the value of τo is and the less the value of a is. This means that, in the tire, the less the aspect ratio is, the stronger the holding force of the belt is and the greater the flatness of the shape of the belt is.

TABLE 1

Preferable ranges of tire internal pressure share
ratio of belt and reduced amount thereof

| Aspect ratio | Internal pressure share ratio τo | Reduced amount a of internal pressure share ratio |
|---|---|---|
| 80 | 0.881 to 0.967 | 0.361 to 1.000 |
| 70 | 0.927 to 0.969 | 0.511 to 0.885 |
| 65 | 0.933 to 0.960 | 0.524 to 0.767 |
| 60 | 0.950 to 0.971 | 0.406 to 0.605 |
| 55 | 0.969 to 0.983 | 0.320 to 0.510 |
| 50 | 0.976 to 0.987 | 0.309 to 0.463 |
| 45 | 0.977 to 0.988 | 0.299 to 0.459 |
| 40 | 0.980 to 0.990 | 0.209 to 0.347 |
| 35 | 0.986 to 0.994 | 0.167 to 0.298 |

In a case where τo is less than the lower limit of the selection range indicated in Table 1, the carcass profile forms a round shape that projects outward, and the belt 112 also forms an excessively round shape. As a result, a gauge of the tread 104 needs to be made thick in a region from a middle portion to a shoulder portion, in the axial direction, of the tread 104. In this case, it may be difficult to obtain a target ground-contact shape. The same also applies to a case where a is less than the lower limit of the selection range indicated in Table 1. Meanwhile, in a case where τo is greater than the upper limit of the selection range indicated in Table 1, flatness of the carcass profile is excessively increased, and flatness of the belt 112 is also increased. As a result, in this case, it may be difficult to obtain a target ground-contact shape. The same also applies to a case where a is greater than the upper limit of the selection range indicated in Table 1.

Next, a method for setting the point A, the point B, the point C, and the point D will be described. Firstly, the point A is a rendering start point on the carcass line. The point A can be defined as a position in a coordinate system in which the originating point is a point of intersection of the tire rotation axis (Y-axis) RA and the tire center line (Z-axis) CL. As shown in FIG. 6, a Y-coordinate position A(y) of the point A is fixed on the center line CL. A Z-coordinate position A(z) of the point A is defined by the diameter on the center line CL. That is, A(z) is calculated for each tire width, on the basis of an inner diameter (corresponding to the outer diameter of the tire) of a mold defined in the standard for each tire width, according to the thickness of the tread rubber and the thickness of the belt 112 at the center line CL portion. In general, A(z)=½(the inner diameter of the mold defined in the standard)−(the thickness of the tread rubber+ the thickness of the belt 112 at the center line CL portion), is satisfied. The standard according to which the inner diameter of the mold is defined, is the JATMA standard, the TRA standard, and the ETRTO standard.

The point B is the separation start point PP at which the inner belt layer 130 separates from the carcass 110, and is also a position of each end of a range in which the belt 112 shares the internal pressure. Similarly to the point A, the point B can be also defined as a position in the coordinate system in which the originating point is the point of intersection of the tire rotation axis RA and the center line (Z-axis) CL. A Y-coordinate position B(y) of the point B is defined as a distance from the originating point in the tire rotation axis direction. A Z-coordinate position B(z) of the point B is defined as a distance from the tire rotation axis RA in the tire radial direction. B(z) is a value calculated as a result of the carcass profile and the profile of the belt 112 layered over the carcass 110 being determined together according to TO and a described above.

Table 2 indicates a range for a ratio of the width of the outer belt layer 132 relative to the tire nominal width, and an additional dimension L. In the present embodiment, according to Table 2, a preferable numerical value range of B(y) can be easily calculated for each of plural predetermined aspect ratios (80, 70, 65, 60, 55, 50, 45, 40, 35) of the tire. It can be said that, in Table 2, the range for the substantially preferable numerical value of B(y) according to the tire width is defined for each of the aspect ratios of 80 to 35. B(y) is preferably calculated from the ranges indicated in Table 2.

B(y) represents a position that is distant from the end of the outer belt layer 132 by a predetermined dimension L in the axial direction. L is an additional dimension that represents a minus value in the axially inward direction and represents a plus value in the axially outward direction.

As indicated in Table 2, in the present embodiment, the width of the outer belt layer 132 is preferably defined as a value between: the lower limit value obtained by multiplying the tire nominal width by a predetermined small coefficient; and the upper limit value obtained by multiplying the tire nominal width by a predetermined large coefficient. The value of B(y) is obtained by the following mathematical expression.

$$B(y)=\frac{1}{2}\times(\text{the width of the outer belt layer 132})+L$$

That is, the value of B(y) is in a preferable selection range corresponding to the selection range defined by the lower limit value and the upper limit value of the outer belt layer 132. The selection range of the ratio and the additional dimension L which are indicated in Table 2 are defined by using the finite element method such that the ground-contact shape and the contact pressure distribution are optimized for each aspect ratio for the small nominal width to the large nominal width (in compliance with the JATMA standard).

An exemplary case where a value of B(y) of the tire in which the aspect ratio is 65 and the tire nominal width is 195, is calculated by using the numerical values in Table 2, will be described below. According to Table 2, the following can be found. That is, the width of the outer belt layer 132 is greater than or equal to 0.708×(tire nominal width) of 195=138.06 and not greater than 0.748×(tire nominal width) of 195=145.86. The additional dimension L is −1.0. Therefore, the preferable value of B(y) is greater than or equal to ½×138.06−1.0=68.03 and not greater than ½×145.86−1.0=71.93.

TABLE 2

Preferable range of outer belt layer width/tire nominal width

| Aspect ratio | Outer belt width/tire nominal width | Additional Dimension L (mm) |
|---|---|---|
| 80 | 0.615 to 0.675 | −2.75 |
| 70 | 0.673 to 0.733 | −1.25 |
| 65 | 0.708 to 0.748 | −1.00 |
| 60 | 0.721 to 0.761 | −1.00 |
| 55 | 0.770 to 0.792 | −0.50 |
| 50 | 0.808 to 0.848 | −0.25 |
| 45 | 0.799 to 0.819 | +0.25 |
| 40 | 0.808 to 0.828 | +0.25 |
| 35 | 0.827 to 0.847 | +0.25 |

In a case where B(y) is greater than the upper limit value calculated according to Table 2, both τo and a are also increased. Further, in the bead portion, the radius of curvature of the carcass line is reduced. As a result, the carcass line extends through a position inward of the point D that is obtained as a target. For some tire width, cushion layers may not be assuredly provided inward of the belt in the tire radial direction. Meanwhile, in a case where B(y) is less than the upper limit value calculated according to Table 2, the carcass line in the bead portion extend through a position outward of the point D. Thus, the range of B(y) is important for extending the carcass line through the point D. Further, the belt width may not be assuredly obtained so as to correspond to the tire width.

The point C represents each end of the maximum width of the carcass. Similarly to the point A and the point B, the point C can be also defined as a position in the coordinate system in which the originating point is a point of intersection of the tire rotation axis (Y-axis) RA and the tire center line (Z-axis) CL. A Y-coordinate position C(y) of the point C is defined as a distance from the originating point in the tire rotation axis direction. A Z-coordinate position C(z) of the point C is defined as a distance from the originating point in the tire radial direction. Similarly to B(z) described above, the position C(z), in the Z-axis direction, of the point C is a value calculated as a result of the carcass profile and the profile of the belt 112 layered over the carcass 110 being determined together according to τo and a described above.

C(y) is calculated, on the basis of the entire width (corresponding to the tire width) WM of a mold defined in the standard, according to a thickness TS of each sidewall 106 and a thickness TC of the carcass 110 in the case of the carcass 110 having a highly turned-up structure as shown in FIG. 6. That is, in general, C(y)=the entire width WM of the mold defined in the standard×½−(the thickness TS of the sidewall+the thickness TC of the carcass 110 in the case of the carcass 110 having a highly turned-up structure) is satisfied. The standard according to which the inner diameter of the mold is defined, is the JATMA standard, the TRA standard, and the ETRTO standard.

In a case where C(y) is greater than a value obtained according to the above-described mathematical expression, it means that the tire is not defined in the standard. Meanwhile, in a case where C(y) is less than a value obtained according to the above-described mathematical expression, the actual width of the tire is less than the nominal width defined in the standard, and the range of the internal pressure share ratio τo (Table 1) is not satisfied. When A(y, z), B(y, z), and C(y, z) are defined as described above, a natural equilibrium shape line can be rendered.

Figure 11:
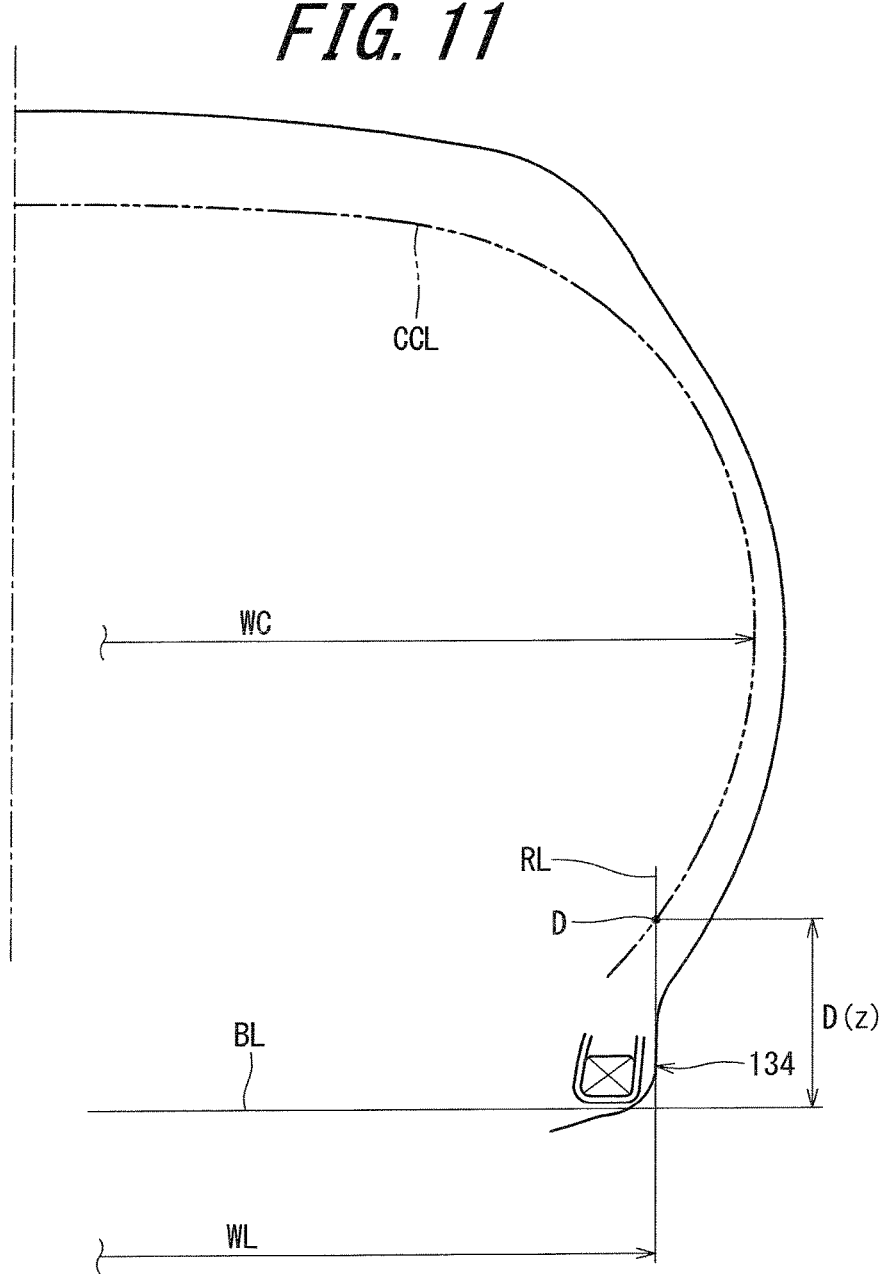
FIG. 11 is a schematic cross-sectional view of a point (point D) of intersection of: a carcass line of the tire shown in FIG. 6; and a straight line, in the tire radial direction, which extends through the end of a clip width of the tire.

As shown in FIG. 11, the point D corresponds to a point of intersection of: the carcass line CCL defined by the point A, the point B, and the point C; and the straight line RL, in the radial direction, which extends through the bead heel 134 that is each end of the clip width WL. The point D is a position near the upper end of a range in which the carcass 110 and each bead 108 share the internal pressure. Therefore, a range between the point B and the point D is a range in which only the carcass receives the tire internal pressure, and a film theory can be applied.

The point D can be defined as a position in a coordinate system in which the originating point is a point of intersection of the bead base line (Y-axis) BL and the tire center line (Z-axis) CL, unlike the points A to C. A Y-coordinate position D(y) of the point D is defined as a distance from the originating point in the tire rotation axis direction. D(y) corresponds to a position of each end of the clip width WL. A Z-coordinate position D(z) of the point D is defined as a distance from the originating point in the tire radial direction.

The clip width WL of the tire based on which the point D is specified, is determined according to a width of a rim to which the tire is mounted. In general, the clip width WL is designed so as to be larger than the reference rim width defined in the standard. However, if the clip width WL is excessively larger than the reference rim width, compressive strain is already generated in bead portions when the tire is mounted to the rim. Therefore, increase of compressive strain under a load may not be endured. Meanwhile, if a difference obtained by subtracting the reference rim width from the clip width WL is excessively small, the bead portions tend to stand (along the tire radial direction) when the tire is mounted to the rim and inflated. Therefore, D(z) becomes high (shifts outward in the tire radial direction).

Table 3 indicates the mathematical expressions for obtaining D(z) described above in consideration of an appropriate value α of the above-described "the clip width WL−the reference rim width". In the description herein, a value calculated according to the mathematical expression is represented as D(z)c for convenience sake. The mathematical expression is defined for each aspect ratio. In the present embodiment, the mathematical expression is defined for the tire of each of the aspect ratios 80, 70, 65, 60, 55, 50, 45, 40, and 35.

As indicated in Table 3, in the present embodiment, the calculated value D(z)c is obtained by performing addition or subtraction, and multiplication with the use of a plurality of predetermined coefficients for the tire nominal width. Further, the mathematical expression contains a difference a obtained by subtracting the reference rim width from the above-described clip width WL. As indicated in Table 4, an appropriate range for the value α is defined for each aspect ratio. Further, in Table 5, a preferable range of D(z) is defined. That is, the preferable range of D(z) is defined in Table 5 such that D(z)c calculated based on the definition in Table 3 and Table 4, has an allowance.

If α is less than the smallest value in the preferable range, that is, if D(y) is less than the smallest value in the preferable range, a bead-to-bead distance is reduced. If the distance is less than a distance between humps of the rim, it is difficult to let in air, and operability for mounting the tire to the rim is reduced. Meanwhile, if α is greater than the largest value in the preferable range, that is, if D(y) is greater than the largest value in the preferable range, a difference from an actual rim width is increased, whereby initial strain is likely to be left in the bead portions when the tire has been mounted to the rim. As a result, durability in the bead portions is reduced.

An exemplary case where a preferable range of the value of D(z) is calculated, for a tire in which the aspect ratio is 65 and the tire nominal width is 195, in the case of, for example, 1.0 being selected as α, will be described below.

D(z)c=0.899×(0.116×195+2.556)+1.620×1.0+0.920=2 5.17 is satisfied. The preferable range of the value of D(z) is a range between the calculated value D(z)c±4. Thus, the preferable range is a range from 21.17 mm inclusive to 29.17 mm inclusive.

TABLE 3

Mathematical expression for calculating D(z)

| Aspect ratio | Mathematical expression for calculating D(z) |
|---|---|
| 80 | 1.092 × (0.112 × nominal width + 6.389) + 1.624 × α − 3.771 |
| 70 | 0.826 × (0.094 × nominal width + 7.514) + 2.490 × α + 1.924 |
| 65 | 0.899 × (0.116 × nominal width + 2.556) + 1.620 × α + 0.920 |

TABLE 3-continued

Mathematical expression for calculating D(z)

| Aspect ratio | Mathematical expression for calculating D(z) |
|---|---|
| 60 | 1.339 × (0.064 × nominal width + 12.264) + 1.718 × α − 10.525 |
| 55 | 0.636 × (0.127 × nominal width − 0.576) + 1.970 × α + 7.868 |
| 50 | 0.944 × (0.044 × nominal width + 15.727) + 2.325 × α − 1.055 |
| 45 | 0.737 × (0.075 × nominal width + 10.026) + 2.139 × α + 5.167 |
| 40 | 0.285 × (0.039 × nominal width + 17.965) + 8.228 × α + 14.368 |
| 35 | 0.005 × (0.125 × nominal width − 0.799) + 9.345 × α + 21.432 |

TABLE 4

Preferable range of value α

| Aspect ratio | Preferable range of value α |
|---|---|
| 80 | 0.8 ≤ α ≤ 1.2 |
| 70 | 0.8 ≤ α ≤ 1.2 |
| 65 | 0.8 ≤ α ≤ 1.2 |
| 60 | 0.8 ≤ α ≤ 1.2 |
| 55 | 0.8 ≤ α ≤ 1.2 |
| 50 | 0.8 ≤ α ≤ 1.2 |
| 45 | 0.9 ≤ α ≤ 1.1 |
| 40 | 0.9 ≤ α ≤ 1.1 |
| 35 | 0.9 ≤ α ≤ 1.1 |

TABLE 5

Preferable range of value D(z)

| Aspect ratio | Preferable range of value D(z) |
|---|---|
| 80 | Calculated value D(z)c − 5 ≤ D(z) ≤ Calculated value D(z)c + 5 |
| 70 | Calculated value D(z)c − 5 ≤ D(z) ≤ Calculated value D(z)c + 5 |
| 65 | Calculated value D(z)c − 4 ≤ D(z) ≤ Calculated value D(z)c + 4 |
| 60 | Calculated value D(z)c − 4 ≤ D(z) ≤ Calculated value D(z)c + 4 |
| 55 | Calculated value D(z)c − 3 ≤ D(z) ≤ Calculated value D(z)c + 3 |
| 50 | Calculated value D(z)c − 3 ≤ D(z) ≤ Calculated value D(z)c + 3 |
| 45 | Calculated value D(z)c − 2 ≤ D(z) ≤ Calculated value D(z)c + 2 |
| 40 | Calculated value D(z)c − 1 ≤ D(z) ≤ Calculated value D(z)c + 1 |
| 35 | Calculated value D(z)c − 1 ≤ D(z) ≤ Calculated value D(z)c + 1 |

If D(z) is greater than the largest value in the preferable range (the point D is too high), the height and the thickness of the apex 126 need to be increased. As a result, a vertical stiffness constant is enhanced, to deteriorate ride comfort. If D(z) is less than the smallest value in the preferable range (the point D is too low), the height and the thickness of the apex 126 need to be reduced. As a result, a lateral stiffness constant is lowered, to reduce handling stability.

As described above, in the present embodiment, a manner that is introduced in "TAIYA KOGAKU(Tire engineering)" by Hideo Sakai, is adopted. In this manner, the carcass profile of the tire mounted to a standard rim can be rendered according to the mathematical expression (4) and the mathematical expression (5) in addition to the mathematical expression (1) described above. A carcass diameter (diameter in the tire radial direction) rc, the carcass width WC, a belt width BW, a rim width, the clip width WL, and the internal pressure share ratio Tb of the belt are assigned to the mathematical expressions (1) to (8), as appropriate, for specifying the point A, the point B, the point C, and the point D, whereby the carcass profile having the natural equilibrium shape for each tire width can be determined. In this case, in the present invention, the four points (A, B, C, D) for each tire width are predefined as plane coordinates on the carcass profile obtained based on the natural equilibrium shape theory, and the nominal width and the aspect ratio of the tire are specified, whereby the carcass profile having the natural equilibrium shape for each tire width can be easily determined.

As described above, in a case where at least three points among the four specific points (A, B, C, D), and τo and a which are associated with the natural equilibrium shape theory, are defined, the carcass profile having the natural equilibrium shape is quantitatively defined. Further, in a step of calculating the carcass profile, in a case where at least seven of τo, a, A(y), A(z), B(y), B(z), C(y), C(z), D(y), and D(z) that are undetermined multipliers as described above, are defined in association with the natural equilibrium shape theory, the carcass profile having the natural equilibrium shape is quantitatively defined.

EXAMPLES

Hereinafter, effects of the present invention will become apparent according to examples. However, the present invention should not be restrictively construed based on the description of examples.

Experiment 1

Example I-1

A pneumatic tire, according to example I-1 indicated below in Table 6, having the fundamental structure shown in FIG. 1 was obtained. The size of the tire was 195/65R15. In Example I-1, the cross-sectional height HS of the tire was 125.0 mm. The thickness of each sidewall at the point PW was 2.5 mm. On the side surface in Example I-1, a zone from the point PB to the point PW was formed by a first main arc, a second main arc, and a third main arc. The radius RM1 of curvature of the first main arc was 55.3 mm. The radius RM2 of curvature of the second main arc was 130.0 mm. The radius RM3 of curvature of the third main arc was 28.0 mm. On the side surface, a zone from the point PW to the point PL2 was formed by a fourth main arc. The radius RM4 of curvature of the fourth arc was 76.8 mm. Thus, in Example I-1, the ratio (RM2/RM1) was 2.35. The ratio (RM3/RM1) was 0.51. The ratio (RM4/RM1) was 1.39. The second main arc was tangent to the first main arc at the point PU1 The third main arc was tangent to the second main arc at the point PU2 The fourth main arc was tangent to the first main arc at the point PW.

Each sidewall was provided with a first recess and a second recess. The contour of the first recess was formed by a first secondary arc and a second secondary arc. The radius RS1 of curvature of the first secondary arc was 45.0 mm. The radius RS2 of curvature of the second secondary arc was 60.3 mm. Thus, the height SU, in the radial direction, from the first reference line to the bottom of the first recess was 20.0 mm. The depth TU of the first recess was 0.8 mm. The ratio (RS1/RM1) was 0.81. The ratio (RS2/RM1) was 1.09. The ratio (SU/HS) was 0.16. The ratio (TU/E) was 0.32. The first secondary arc was tangent to the first main arc at the point PW. The second secondary arc was tangent to the second main arc at the point PU3.

The contour of the second recess was formed by a third secondary arc and a fourth secondary arc. The radius RS3 of curvature of the third secondary arc was 50.0 mm. The radius RS4 of curvature of the fourth secondary arc was 100.0 mm. Thus, the height SL, in the radial direction, from the first reference line to the bottom of the second recess was 20.0 mm. The depth TL of the second recess was 0.8 mm. A ratio (RS3/RM4) was 0.65. A ratio (RS4/RM4) was 1.30. A ratio (SL/HS) was 0.16. A ratio (TL/E) was 0.32. The third secondary arc was tangent to the fourth main arc at the point PW. The fourth secondary arc was tangent to the fourth main arc at the point PL2.

Comparative Example I-1

A tire of comparative example I-1 was obtained in the same manner as for example I-1 except that the first main arc and the third main arc were joined by a straight line instead of an arc, the radius RM1, the radius RM3, and the radius RM4 were as indicated below in Table 6, and the first recess and the second recess were not provided.

Comparative Example I-2

A tire of comparative example I-2 was obtained in the same manner as for example I-1 except that the first main arc and the third main arc were joined by a straight line instead of an arc, the radius RM1, the radius RM3, the radius RM4, the radius RS1, the radius RS2, the radius RS3, and the radius RS4 were as indicated below in Table 1, and each sidewall was provided with the first recess and the second recess.

Comparative Example I-3

A tire of comparative example I-3 was obtained in the same manner as for example I-1 except that the first recess and the second recess were not provided.

Comparative Example I-4

A tire of comparative example I-4 was obtained in the same manner as for example I-1 except that the second recess was not provided.

Comparative Example I-5

A tire of comparative example I-5 was obtained in the same manner as for example I-1 except that the first recess was not provided.

Examples I-2 to I-29 and Comparative Examples I-6 to I-9

Tires of Examples I-2 to I-29 and Comparative examples I-6 to I-9 were obtained in the same manner as for example I-1 except that the radius RM1, the radius RM2, the radius RM3, the radius RM4, the radius RS1, the radius RS2, the radius RS3, and the radius RS4 were adjusted, and the ratio (RM2/RM1), the ratio (RM3/RM1), the ratio (RS1/RM1), the ratio (RS2/RM1), the ratio (RS4/RM4), the ratio (RS3/RM4), the height SU, the depth TU, the ratio (SU/HS), the ratio (TU/E), the height SL, the depth TL, the ratio (SL/HS), and the ratio (TL/E) were as indicated below in Table 7 to Table 13.

[Mass and Rolling Resistance]

An analysis was performed, under the following conditions, by the finite element method (FEM), and the mass and rolling resistance of each tire were calculated. The results thereof are indicated below as indexes in Table 6 to Table 13 with the index of Comparative example I-5 being 100. The less the value of the index of the mass is, the less the mass is. The less the value of the index of the rolling resistance is, the less the rolling resistance is. Therefore, for the rolling resistance, the less the value is, the better the result is.

Rim: 6.0 JJ
Internal pressure: 230 kPa
Load: 4.24 kN

TABLE 6

| | | Evaluation results | | | | | |
|---|---|---|---|---|---|---|---|
| | | Comp. Ex. I-1 | Comp. Ex. I-2 | Comp. Ex. I-3 | Comp. Ex. I-4 | Comp. Ex. I-5 | Ex. I-1 |
| Height HS [mm] | | 125.0 | 125.0 | 125.0 | 125.0 | 125.0 | 125.0 |
| Thickness E [mm] Zone (PB to PW) | | 2.5 | 2.5 | 2.5 | 2.5 | 2.5 | 2.5 |
| Radius RM1 [mm] | | 55.3 | 55.3 | 55.3 | 55.3 | 55.3 | 55.3 |
| Radius RM2 [mm] | | — | — | 130.0 | 130.0 | 130.0 | 130.0 |
| Radius RM3 [mm] | | 25.0 | 25.0 | 25.0 | 25.0 | 25.0 | 28.0 |
| Radius RS1 [mm] | | — | 45.0 | — | 45.0 | — | 45.0 |
| Radius RS2 [mm] | | — | 60.3 | — | 60.3 | — | 60.3 |
| Ratio (RM2/RM1) | | — | — | 2.35 | 2.35 | 2.35 | 2.35 |
| Ratio (RM3/RM1) | | 0.45 | 0.45 | 0.45 | 0.45 | 0.45 | 0.51 |
| Ratio (RS1/RM1) | | — | 0.81 | — | 0.81 | — | 0.81 |
| Ratio (RS2/RM1) | | — | 1.09 | — | 1.09 | — | 1.09 |
| First recess | Height SU [mm] | — | 20.0 | — | 20.0 | — | 20.0 |
| | Depth TU [mm] | — | 0.8 | — | 0.8 | — | 0.8 |
| | Ratio (SU/HS) | — | 0.16 | — | 0.16 | — | 0.16 |
| | Ratio (TU/E) | — | 0.32 | — | 0.32 | — | 0.32 |

TABLE 6-continued

|  |  | Evaluation results | | | | | |
|---|---|---|---|---|---|---|---|
|  |  | Comp. Ex. I-1 | Comp. Ex. I-2 | Comp. Ex. I-3 | Comp. Ex. I-4 | Comp. Ex. I-5 | Ex. I-1 |
| Zone (PW to PL2) | | | | | | | |
| Radius RM4 [mm] | | 76.8 | 76.8 | 76.8 | 76.8 | 76.8 | 76.8 |
| Radius RS4 [mm] | | — | 100.0 | — | — | 100.0 | 100.0 |
| Radius RS3 [mm] | | — | 50.0 | — | — | 50.0 | 50.0 |
| Ratio (RS4/RM4) | | — | 1.30 | — | — | 1.30 | 1.30 |
| Ratio (RS3/RM4) | | — | 0.65 | — | — | 0.65 | 0.65 |
| Second recess | Height SL [mm] | — | 20.0 | — | — | 20.0 | 20.0 |
|  | Depth TL [mm] | — | 0.8 | — | — | 0.8 | 0.8 |
|  | Ratio (SL/HS) | — | 0.16 | — | — | 0.16 | 0.16 |
|  | Ratio (TL/E) | — | 0.32 | — | — | 0.32 | 0.32 |
| Ratio (RM4/RM1) | | 1.39 | 1.39 | 1.39 | 1.39 | 1.39 | 1.39 |
| Mass | | 100.0 | 99.2 | 100.4 | 99.8 | 99.8 | 100.8 |
| Rolling resistance | | 100.0 | 99.8 | 99.7 | 99.6 | 99.6 | 98.7 |

TABLE 7

|  |  | Evaluation results | | | | | |
|---|---|---|---|---|---|---|---|
|  |  | Comp. Ex. I-6 | Ex. I-2 | Ex. I-3 | Ex. I-4 | Ex. I-5 | Comp. Ex. I-7 |
| Height HS [mm] | | 125.0 | 125.0 | 125.0 | 125.0 | 125.0 | 125.0 |
| Thickness E [mm] | | 2.5 | 2.5 | 2.5 | 2.5 | 2.5 | 2.5 |
| Zone (PB to PW) | | | | | | | |
| Radius RM1 [mm] | | 55.3 | 55.3 | 55.3 | 55.3 | 55.3 | 55.3 |
| Radius RM2 [mm] | | 60.3 | 80.0 | 80.0 | 90.0 | 180.3 | 200.0 |
| Radius RM3 [mm] | | 22.0 | 25.0 | 25.0 | 26.0 | 31.0 | 34.3 |
| Radius RS1 [mm] | | 45.0 | 25.0 | 28.0 | 30.0 | 60.3 | 45.0 |
| Radius RS2 [mm] | | 60.3 | 35.0 | 38.0 | 40.0 | 80.0 | 60.3 |
| Ratio (RM2/RM1) | | 1.09 | 1.45 | 1.45 | 1.63 | 3.26 | 3.62 |
| Ratio (RM3/RM1) | | 0.40 | 0.45 | 0.45 | 0.47 | 0.56 | 0.62 |
| Ratio (RS1/RM1) | | 0.81 | 0.45 | 0.51 | 0.54 | 1.09 | 0.81 |
| Ratio (RS2/RM1) | | 1.09 | 0.63 | 0.69 | 0.72 | 1.45 | 1.09 |
| First recess | Height SU [mm] | 20.0 | 10.0 | 12.5 | 15.0 | 25.0 | 20.0 |
|  | Depth TU [mm] | 0.8 | 0.4 | 0.5 | 0.6 | 1.0 | 0.8 |
|  | Ratio (SU/HS) | 0.16 | 0.08 | 0.10 | 0.12 | 0.20 | 0.16 |
|  | Ratio (TU/E) | 0.32 | 0.16 | 0.20 | 0.24 | 0.40 | 0.32 |
| Zone (PW to PL2) | | | | | | | |
| Radius RM4 [mm] | | 76.8 | 76.8 | 76.8 | 76.8 | 76.8 | 76.8 |
| Radius RS4 [mm] | | 100.0 | 50.0 | 75.0 | 100.0 | 100.0 | 100.0 |
| Radius RS3 [mm] | | 50.0 | 30.0 | 40.0 | 50.0 | 50.0 | 50.0 |
| Ratio (RS4/RM4) | | 1.30 | 0.65 | 0.98 | 1.30 | 1.30 | 1.30 |
| Ratio (RS3/RM4) | | 0.65 | 0.39 | 0.52 | 0.65 | 0.65 | 0.65 |
| Second recess | Height SL [mm] | 20.0 | 10.0 | 12.5 | 15.0 | 25.0 | 20.0 |
|  | Depth TL [mm] | 0.8 | 0.4 | 0.5 | 0.6 | 1.0 | 0.8 |
|  | Ratio (SL/HS) | 0.16 | 0.08 | 0.10 | 0.12 | 0.20 | 0.16 |
|  | Ratio (TL/E) | 0.32 | 0.16 | 0.20 | 0.24 | 0.40 | 0.32 |
| Ratio (RM4/RM1) | | 1.39 | 1.39 | 1.39 | 1.39 | 1.39 | 1.39 |
| Mass | | 100.3 | 100.8 | 101.6 | 101.9 | 103.1 | 103.3 |
| Rolling resistance | | 99.6 | 99.3 | 99.3 | 99.2 | 99.5 | 100.8 |

TABLE 8

|  | Evaluation results | | | | | |
|---|---|---|---|---|---|---|
|  | Comp. Ex. I-8 | Ex. I-6 | Ex. I-7 | Ex. I-8 | Ex. I-9 | Comp. Ex. I-9 |
| Height HS [mm] | 125.0 | 125.0 | 125.0 | 125.0 | 125.0 | 125.0 |
| Thickness E [mm] | 2.5 | 2.5 | 2.5 | 2.5 | 2.5 | 2.5 |

TABLE 8-continued

| | | Comp. Ex. I-8 | Ex. I-6 | Ex. I-7 | Ex. I-8 | Ex. I-9 | Comp. Ex. I-9 |
|---|---|---|---|---|---|---|---|
| Zone (PB to PW) | | | | | | | |
| Radius RM1 [mm] | | 55.3 | 55.3 | 55.3 | 55.3 | 55.3 | 55.3 |
| Radius RM2 [mm] | | 130.0 | 130.0 | 130.0 | 130.0 | 130.0 | 130.0 |
| Radius RM3 [mm] | | 28.0 | 28.0 | 28.0 | 28.0 | 28.0 | 28.0 |
| Radius RS1 [mm] | | 45.0 | 45.0 | 45.0 | 45.0 | 45.0 | 45.0 |
| Radius RS2 [mm] | | 60.3 | 60.3 | 60.3 | 60.3 | 60.3 | 60.3 |
| Ratio (RM2/RM1) | | 2.35 | 2.35 | 2.35 | 2.35 | 2.35 | 2.35 |
| Ratio (RM3/RM1) | | 0.51 | 0.51 | 0.51 | 0.51 | 0.51 | 0.51 |
| Ratio (RS1/RM1) | | 0.81 | 0.81 | 0.81 | 0.81 | 0.81 | 0.81 |
| Ratio (RS2/RM1) | | 1.09 | 1.09 | 1.09 | 1.09 | 1.09 | 1.09 |
| First recess | Height SU [mm] | 8.0 | 10.0 | 20.0 | 25.0 | 30.0 | 35.0 |
| | Depth TU [mm] | 0.2 | 0.4 | 0.4 | 1.2 | 1.2 | 1.4 |
| | Ratio (SU/HS) | 0.06 | 0.08 | 0.16 | 0.20 | 0.24 | 0.28 |
| | Ratio (TU/E) | 0.08 | 0.16 | 0.16 | 0.48 | 0.48 | 0.56 |
| Zone (PW to PL2) | | | | | | | |
| Radius RM4 [mm] | | 76.8 | 76.8 | 76.8 | 76.8 | 76.8 | 76.8 |
| Radius RS4 [mm] | | 100.0 | 100.0 | 100.0 | 100.0 | 100.0 | 100.0 |
| Radius RS3 [mm] | | 50.0 | 50.0 | 50.0 | 50.0 | 50.0 | 50.0 |
| Ratio (RS4/RM4) | | 1.30 | 1.30 | 1.30 | 1.30 | 1.30 | 1.30 |
| Ratio (RS3/RM4) | | 0.65 | 0.65 | 0.65 | 0.65 | 0.65 | 0.65 |
| Second recess | Height SL [mm] | 8.0 | 10.0 | 20.0 | 25.0 | 30.0 | 35.0 |
| | Depth TL [mm] | 0.2 | 0.4 | 0.4 | 1.2 | 1.2 | 1.4 |
| | Ratio (SL/HS) | 0.06 | 0.08 | 0.16 | 0.20 | 0.24 | 0.28 |
| | Ratio (TL/E) | 0.08 | 0.16 | 0.16 | 0.48 | 0.48 | 0.56 |
| Ratio (RM4/RM1) | | 1.39 | 1.39 | 1.39 | 1.39 | 1.39 | 1.39 |
| Mass | | 101.1 | 100.8 | 100.8 | 100.1 | 100.1 | 99.4 |
| Rolling resistance | | 99.6 | 98.9 | 98.7 | 98.8 | 98.8 | 99.6 |

TABLE 9

| | | Ex. I-10 | Ex. I-11 | Ex. I-12 | Ex. I-13 |
|---|---|---|---|---|---|
| Height HS [mm] | | 125.0 | 125.0 | 125.0 | 125.0 |
| Thickness E [mm] | | 2.5 | 2.5 | 2.5 | 2.5 |
| Zone (PB to PW) | | | | | |
| Radius RM1 [mm] | | 55.3 | 55.3 | 55.3 | 55.3 |
| Radius RM2 [mm] | | 130.0 | 130.0 | 130.0 | 130.0 |
| Radius RM3 [mm] | | 28.0 | 28.0 | 28.0 | 28.0 |
| Radius RS1 [mm] | | 20.0 | 25.0 | 65.0 | 75.0 |
| Radius RS2 [mm] | | 60.3 | 60.3 | 60.3 | 60.3 |
| Ratio (RM2/RM1) | | 2.35 | 2.35 | 2.35 | 2.35 |
| Ratio (RM3/RM1) | | 0.51 | 0.51 | 0.51 | 0.51 |
| Ratio (RS1/RM1) | | 0.36 | 0.45 | 1.18 | 1.36 |
| Ratio (RS2/RM1) | | 1.09 | 1.09 | 1.09 | 1.09 |
| First recess | Height SU [mm] | 20.0 | 20.0 | 20.0 | 20.0 |
| | Depth TU [mm] | 0.8 | 0.8 | 0.8 | 0.8 |
| | Ratio (SU/HS) | 0.16 | 0.16 | 0.16 | 0.16 |
| | Ratio (TU/E) | 0.32 | 0.32 | 0.32 | 0.32 |
| Zone (PW to PL2) | | | | | |
| Radius RM4 [mm] | | 76.8 | 76.8 | 76.8 | 76.8 |
| Radius RS4 [mm] | | 100.0 | 100.0 | 100.0 | 100.0 |
| Radius RS3 [mm] | | 50.0 | 50.0 | 50.0 | 50.0 |
| Ratio (RS4/RM4) | | 1.30 | 1.30 | 1.30 | 1.30 |
| Ratio (RS3/RM4) | | 0.65 | 0.65 | 0.65 | 0.65 |
| Second recess | Height SL [mm] | 25.0 | 25.0 | 30.0 | 30.0 |
| | Depth TL [mm] | 0.8 | 0.8 | 0.8 | 0.8 |
| | Ratio (SL/HS) | 0.20 | 0.20 | 0.24 | 0.24 |
| | Ratio (TL/E) | 0.32 | 0.32 | 0.32 | 0.32 |
| Ratio (RM4/RM1) | | 1.39 | 1.39 | 1.39 | 1.39 |
| Mass | | 99.2 | 99.2 | 99.6 | 99.5 |
| Rolling resistance | | 99.0 | 98.8 | 98.9 | 99.1 |

TABLE 10

| | | Ex. I-14 | Ex. I-15 | Ex. I-16 | Ex. I-17 |
|---|---|---|---|---|---|
| Height HS [mm] | | 125.0 | 125.0 | 125.0 | 125.0 |
| Thickness E [mm] | | 2.5 | 2.5 | 2.5 | 2.5 |
| Zone (PB to PW) | | | | | |
| Radius RM1 [mm] | | 55.3 | 55.3 | 55.3 | 55.3 |
| Radius RM2 [mm] | | 80.0 | 80.0 | 100.0 | 100.0 |
| Radius RM3 [mm] | | 28.0 | 28.0 | 30.0 | 30.0 |
| Radius RS1 [mm] | | 45.0 | 45.0 | 60.0 | 60.0 |
| Radius RS2 [mm] | | 27.7 | 34.9 | 85.2 | 107.8 |
| Ratio (RM2/RM1) | | 1.45 | 1.45 | 1.81 | 1.81 |
| Ratio (RM3/RM1) | | 0.51 | 0.51 | 0.54 | 0.54 |
| Ratio (RS1/RM1) | | 0.81 | 0.81 | 1.08 | 1.08 |
| Ratio (RS2/RM1) | | 0.50 | 0.63 | 1.54 | 1.95 |
| First recess | Height SU [mm] | 20.0 | 20.0 | 20.0 | 20.0 |
| | Depth TU [mm] | 0.8 | 0.8 | 1.0 | 1.0 |
| | Ratio (SU/HS) | 0.16 | 0.16 | 0.16 | 0.16 |
| | Ratio (TU/E) | 0.32 | 0.32 | 0.40 | 0.40 |
| Zone (PW to PL2) | | | | | |
| Radius RM4 [mm] | | 76.8 | 76.8 | 76.8 | 76.8 |
| Radius RS4 [mm] | | 80.0 | 80.0 | 100.0 | 100.0 |
| Radius RS3 [mm] | | 50.0 | 50.0 | 60.0 | 60.0 |
| Ratio (RS4/RM4) | | 1.04 | 1.04 | 1.30 | 1.30 |
| Ratio (RS3/RM4) | | 0.65 | 0.65 | 0.78 | 0.78 |
| Second recess | Height SL [mm] | 20.0 | 20.0 | 20.0 | 20.0 |
| | Depth TL [mm] | 0.8 | 0.8 | 1.0 | 1.0 |
| | Ratio (SL/HS) | 0.16 | 0.16 | 0.16 | 0.16 |
| | Ratio (TL/E) | 0.32 | 0.32 | 0.40 | 0.40 |
| Ratio (RM4/RM1) | | 1.39 | 1.39 | 1.39 | 1.39 |
| Mass | | 99.8 | 99.6 | 99.7 | 99.5 |
| Rolling resistance | | 99.1 | 98.9 | 99.0 | 99.1 |

TABLE 11

Evaluation results

|  |  | Ex. I-18 | Ex. I-19 | Ex. I-20 | Ex. I-21 |
|---|---|---|---|---|---|
|  | Height HS [mm] | 125.0 | 125.0 | 125.0 | 125.0 |
|  | Thickness E [mm] | 2.5 | 2.5 | 2.5 | 2.5 |
|  | Zone (PB to PW) |  |  |  |  |
|  | Radius RM1 [mm] | 55.3 | 55.3 | 55.3 | 55.3 |
|  | Radius RM2 [mm] | 100.0 | 100.0 | 130.0 | 130.0 |
|  | Radius RM3 [mm] | 26.0 | 26.0 | 28.0 | 28.0 |
|  | Radius RS1 [mm] | 30.0 | 30.0 | 45.0 | 45.0 |
|  | Radius RS2 [mm] | 45.0 | 45.0 | 60.3 | 60.3 |
|  | Ratio (RM2/RM1) | 1.81 | 1.81 | 2.35 | 2.35 |
|  | Ratio (RM3/RM1) | 0.47 | 0.47 | 0.51 | 0.51 |
|  | Ratio (RS1/RM1) | 0.54 | 0.54 | 0.81 | 0.81 |
|  | Ratio (RS2/RM1) | 0.81 | 0.81 | 1.09 | 1.09 |
| First | Height SU [mm] | 20.0 | 20.0 | 20.0 | 20.0 |
| recess | Depth TU [mm] | 0.8 | 0.8 | 0.8 | 0.8 |
|  | Ratio (SU/HS) | 0.16 | 0.16 | 0.16 | 0.16 |
|  | Ratio (TU/E) | 0.32 | 0.32 | 0.32 | 0.32 |
|  | Zone (PW to PL2) |  |  |  |  |
|  | Radius RM4 [mm] | 76.8 | 76.8 | 76.8 | 76.8 |
|  | Radius RS4 [mm] | 80.0 | 80.0 | 100.0 | 100.0 |
|  | Radius RS3 [mm] | 23.0 | 30.0 | 70.0 | 76.8 |
|  | Ratio (RS4/RM4) | 1.04 | 1.04 | 1.30 | 1.30 |
|  | Ratio (RS3/RM4) | 0.30 | 0.39 | 0.91 | 1.00 |
| Second | Height SL [mm] | 25.0 | 25.0 | 30.0 | 30.0 |
| recess | Depth TL [mm] | 0.8 | 0.8 | 0.8 | 0.8 |
|  | Ratio (SL/HS) | 0.20 | 0.20 | 0.24 | 0.24 |
|  | Ratio (TL/E) | 0.32 | 0.32 | 0.32 | 0.32 |
|  | Ratio (RM4/RM1) | 1.39 | 1.39 | 1.39 | 1.39 |
|  | Mass | 99.6 | 99.5 | 99.3 | 99.2 |
|  | Rolling resistance | 99.0 | 98.9 | 98.7 | 98.9 |

TABLE 12

Evaluation results

|  |  | Ex. I-22 | Ex. I-23 | Ex. I-24 | Ex. I-25 |
|---|---|---|---|---|---|
|  | Height HS [mm] | 125.0 | 125.0 | 125.0 | 125.0 |
|  | Thickness E [mm] | 2.5 | 2.5 | 2.5 | 2.5 |
|  | Zone (PB to PW) |  |  |  |  |
|  | Radius RM1 [mm] | 55.3 | 55.3 | 55.3 | 55.3 |
|  | Radius RM2 [mm] | 100.0 | 100.0 | 130.0 | 130.0 |
|  | Radius RM3 [mm] | 26.0 | 26.0 | 28.0 | 28.0 |
|  | Radius RS1 [mm] | 30.0 | 30.0 | 45.0 | 45.0 |
|  | Radius RS2 [mm] | 40.0 | 40.0 | 60.0 | 60.0 |
|  | Ratio (RM2/RM1) | 1.81 | 1.81 | 2.35 | 2.35 |
|  | Ratio (RM3/RM1) | 0.47 | 0.47 | 0.51 | 0.51 |
|  | Ratio (RS1/RM1) | 0.54 | 0.54 | 0.81 | 0.81 |
|  | Ratio (RS2/RM1) | 0.72 | 0.72 | 1.08 | 1.08 |
| First | Height SU [mm] | 20.0 | 20.0 | 20.0 | 20.0 |
| recess | Depth TU [mm] | 0.8 | 0.8 | 0.8 | 0.8 |
|  | Ratio (SU/HS) | 0.16 | 0.16 | 0.16 | 0.16 |
|  | Ratio (TU/E) | 0.32 | 0.32 | 0.32 | 0.32 |
|  | Zone (PW to PL2) |  |  |  |  |
|  | Radius RM4 [mm] | 76.8 | 76.8 | 76.8 | 76.8 |
|  | Radius RS4 [mm] | 38.4 | 50.0 | 150.0 | 161.3 |
|  | Radius RS3 [mm] | 40.0 | 40.0 | 60.0 | 60.0 |
|  | Ratio (RS4/RM4) | 0.50 | 0.65 | 1.95 | 2.10 |
|  | Ratio (RS3/RM4) | 0.52 | 0.52 | 0.78 | 0.78 |
| Second | Height SL [mm] | 25.0 | 25.0 | 30.0 | 30.0 |
| recess | Depth TL [mm] | 0.8 | 0.8 | 0.8 | 0.8 |
|  | Ratio (SL/HS) | 0.20 | 0.20 | 0.24 | 0.24 |
|  | Ratio (TL/E) | 0.32 | 0.32 | 0.32 | 0.32 |
|  | Ratio (RM4/RM1) | 1.39 | 1.39 | 1.39 | 1.39 |
|  | Mass | 99.8 | 99.7 | 99.5 | 99.4 |
|  | Rolling resistance | 99.1 | 99.0 | 98.9 | 99.1 |

TABLE 13

Evaluation results

|  |  | Ex. I-26 | Ex. I-27 | Ex. I-28 | Ex. I-29 |
|---|---|---|---|---|---|
|  | Height HS [mm] | 125.0 | 125.0 | 125.0 | 125.0 |
|  | Thickness E [mm] | 2.5 | 2.5 | 2.5 | 2.5 |
|  | Zone (PB to PW) |  |  |  |  |
|  | Radius RM1 [mm] | 55.3 | 55.3 | 55.3 | 55.3 |
|  | Radius RM2 [mm] | 130.0 | 130.0 | 130.0 | 130.0 |
|  | Radius RM3 [mm] | 28.0 | 28.0 | 28.0 | 28.0 |
|  | Radius RS1 [mm] | 45.0 | 45.0 | 45.0 | 45.0 |
|  | Radius RS2 [mm] | 60.3 | 60.3 | 60.3 | 60.3 |
|  | Ratio (RM2/RM1) | 2.35 | 2.35 | 2.35 | 2.35 |
|  | Ratio (RM3/RM1) | 0.51 | 0.51 | 0.51 | 0.51 |
|  | Ratio (RS1/RM1) | 0.81 | 0.81 | 0.81 | 0.81 |
|  | Ratio (RS2/RM1) | 1.09 | 1.09 | 1.09 | 1.09 |
| First | Height SU [mm] | 20.0 | 20.0 | 20.0 | 20.0 |
| recess | Depth TU [mm] | 0.8 | 0.8 | 0.8 | 0.8 |
|  | Ratio (SU/HS) | 0.16 | 0.16 | 0.16 | 0.16 |
|  | Ratio (TU/E) | 0.32 | 0.32 | 0.32 | 0.32 |
|  | Zone (PW to PL2) |  |  |  |  |
|  | Radius RM4 [mm] | 63.6 | 71.9 | 80.2 | 88.5 |
|  | Radius RS4 [mm] | 100.0 | 100.0 | 100.0 | 100.0 |
|  | Radius RS3 [mm] | 50.0 | 50.0 | 50.0 | 50.0 |
|  | Ratio (RS4/RM4) | 1.57 | 1.39 | 1.25 | 1.13 |
|  | Ratio (RS3/RM4) | 0.79 | 0.70 | 0.62 | 0.56 |
| Second | Height SL [mm] | 25.0 | 25.0 | 30.0 | 30.0 |
| recess | Depth TL [mm] | 0.8 | 0.8 | 0.8 | 0.8 |
|  | Ratio (SL/HS) | 0.20 | 0.20 | 0.24 | 0.24 |
|  | Ratio (TL/E) | 0.32 | 0.32 | 0.32 | 0.32 |
|  | Ratio (RM4/RM1) | 1.15 | 1.30 | 1.45 | 1.60 |
|  | Mass | 99.8 | 99.7 | 99.6 | 99.5 |
|  | Rolling resistance | 99.1 | 99.0 | 98.9 | 99.1 |

As indicated in Table 6 to Table 13, evaluation of the tires of examples is higher than evaluation of the tires of comparative examples. The evaluation results clearly indicate that the present invention is superior.

Experiment 2

All tires described below as examples and comparative examples have the tire size of 195/65R15. For each tire, the ground-contact shape and the contact pressure distribution were measured. The ground-contact shape was evaluated by a factor, FSF (Foot Print Shape Factor). The evaluation was made according to indexes with the full marks for the index being 5. The greater the value is, the better the result is. For each tire, a publicly known test for evaluating resistance to uneven wear was made by using a bench tester for wear energy. Evaluation was made according to a ratio between wear energy in a crown portion and wear energy in shoulder portions in a tread of each tire. The evaluation was made according to indexes with the full marks for the index being 5. The greater the value is, the better the result is. For each tire, an amount of protrusion of the carcass profile which was obtained by the tire being inflated to an internal pressure defined in the standard, was calculated at the stage of designing. The amount of protrusion was calculated by using the finite element method. In particular, an amount of protrusion of a buttress portion and an amount of protrusion of a bead portion were calculated. Uniformity of deformation of the carcass profile was evaluated according to a ratio between the amounts of protrusions of both the portions. The closer the ratio is to 1, the better the result is. For each tire, ride comfort was evaluated in an actual vehicle running test by using a test vehicle. The evaluation was a sensory evaluation, by a driver of the test vehicle, concerning upthrust during running on a rough road. The evaluation was made according to indexes with the full marks for the index being 5. The greater the value is, the better the result is. For each tire, road noise resistance was evaluated in an actual vehicle running test by using a test vehicle. A sound pressure level was measured during running by using a measuring instrument disposed at a predetermined position in a driver's seat in the test vehicle. The evaluation was made according to indexes with the full marks for the index being 5. The greater the value is, the better the result is.

Example II-1

For Example II-1, a tire having the fundamental structure shown in FIG. 6 was produced. Values of τo, a, B(y), and D(z) described above at the stage of designing of a carcass of the tire, are indicated in Table 14. Evaluation results of the ground-contact shape, an amount of protrusion of the carcass profile, resistance to uneven wear, ride comfort, and road noise resistance are indicated in Table 14.

Example II-2

For Example II-2, a tire having the fundamental structure shown in FIG. 6 was produced. Values of τo, a, B(y), and D(z) described above at the stage of designing of a carcass of the tire, are indicated in Table 14. The other components and the procedure of the evaluation test were the same as for Example II-1. Evaluation results of the ground-contact shape, an amount of protrusion of the carcass profile, resistance to uneven wear, ride comfort, and road noise resistance are indicated in Table 14.

Comparative examples II-1 to II-4

For Comparative examples II-1 to II-4, tires having the fundamental structure shown in FIG. 6 were produced. Values of τo, a, B(y), and D(z) described above at the stage of designing of a carcass of each tire, are indicated in Table 14. The other components and the procedure of the evaluation test were the same as for Example II-1. Evaluation results of the ground-contact shape, an amount of protrusion of the carcass profile, resistance to uneven wear, ride comfort, and road noise resistance are indicated in Table 14.

Examples II-3 to II-7

For Examples II-3 to II-7, tires having the fundamental structure shown in FIG. 6 were produced. Values of τo, a, B(y), and D(z) described above at the stage of designing of a carcass of each tire, are indicated in Table 15. The other components and the procedure of the evaluation test were the same as for Example II-1. Evaluation results of the ground-contact shape, an amount of protrusion of the carcass profile, resistance to uneven wear, ride comfort, and road noise resistance are indicated in Table 15.

TABLE 14

Evaluation results of tire performance

| | Comp. Ex. II-1 | Comp. Ex. II-2 | Comp. Ex. II-3 | Comp. Ex. II-4 | Ex. II-1 | Ex. II-2 |
|---|---|---|---|---|---|---|
| Internal pressure share ratio τo of belt | 0.920 | 0.975 | 0.935 | 0.955 | 0.935 | 0.955 |
| Reduced amount a of internal pressure share ratio | 0.750 | 0.530 | 0.800 | 0.500 | 0.750 | 0.530 |
| B (y) (mm) | 67.0 | 67.0 | 69.0 | 69.0 | 65.0 | 73.0 |
| D (z) (mm) | 20.0 | 20.0 | 23.0 | 23.0 | 25.0 | 25.0 |
| Ground-contact shape (Contact pressure distribution) | 3.0 | 3.0 | 3.5 | 3.5 | 4.0 | 4.0 |
| Amount of protrusion in profile (mm) Buttress portion | 1.8 | 2.6 | 1.6 | 2.4 | 1.0 | 1.3 |
| Amount of protrusion in profile (mm) Bead portion | 2.5 | 1.7 | 2.3 | 1.5 | 1.2 | 1.2 |
| Amount of protrusion in profile (mm) Ratio in amount thereof between both portions | 0.72 | 1.53 | 0.70 | 1.60 | 0.83 | 1.08 |
| Resistance to uneven wear | 3.0 | 3.0 | 3.5 | 3.5 | 4.0 | 4.0 |
| Ride comfort | 5.0 | 5.0 | 4.7 | 4.7 | 4.5 | 4.5 |
| Road noise resistance | 5.0 | 5.0 | 4.7 | 4.7 | 4.5 | 4.5 |

TABLE 15

Evaluation results of tire performance

| | Ex. II-3 | Ex. II-4 | Ex. II-5 | Ex. II-6 | Ex. II-7 |
|---|---|---|---|---|---|
| Internal pressure share ratio τo of belt | 0.935 | 0.955 | 0.933 | 0.947 | 0.960 |
| Reduced amount a of internal pressure share ratio | 0.750 | 0.530 | 0.524 | 0.646 | 0.767 |
| B(y) (mm) | 71.0 | 71.0 | 69.0 | 70.0 | 71.0 |
| D(z) (mm) | 15.0 | 35.0 | 20.0 | 25.0 | 30.0 |
| Ground-contact shape (Contact pressure distribution) | 4.7 | 4.7 | 4.5 | 5.0 | 4.5 |
| Amount of protrusion in profile (mm) Buttress portion | 0.9 | 1.5 | 1.1 | 0.8 | 0.9 |
| Amount of protrusion in profile (mm) Bead portion | 1.1 | 1.4 | 0.9 | 0.8 | 1.0 |
| Amount of protrusion in profile (mm) Ratio in amount thereof between both portions | 0.82 | 1.07 | 1.22 | 1.00 | 0.90 |
| Resistance to uneven wear | 4.7 | 4.7 | 4.5 | 5.0 | 4.5 |
| Ride comfort | 5.0 | 4.0 | 5.0 | 4.7 | 4.5 |
| Road noise resistance | 5.0 | 4.0 | 5.0 | 4.7 | 4.5 |

As indicated in Table 14 and Table 15, in the tires of examples, evaluation concerning uniformity of an amount of protrusion is higher than in the tires of comparative examples. As a result, evaluations concerning ground-contact shape, contact pressure distribution, and resistance to uneven wear are also high. Evaluations for ride comfort and road noise resistance may not be different between examples and comparative examples.

INDUSTRIAL APPLICABILITY

The tire described above is applicable to various vehicles. The method for determining the carcass profile as described above is applicable to various passenger cars.

DESCRIPTION OF THE REFERENCE CHARACTERS

2 . . . tire
4 . . . rim
6 . . . tread
8 . . . sidewall
10 . . . clinch
12 . . . bead
14 . . . carcass
38 . . . mold
40 . . . raw cover
42 . . . bladder
44 . . . cavity surface
46 . . . ground-contact surface
48 . . . side surface
50, 50a, 50b . . . recess
102 . . . tire
104 . . . tread
106 . . . sidewall
108 . . . bead
110 . . . carcass
112 . . . belt
114 . . . inner liner
116 . . . chafer
120 . . . tread surface
122 . . . groove
124 . . . core
126 . . . apex
128 . . . carcass ply
130 . . . inner belt layer
132 . . . outer belt layer
134 . . . bead heel
BL . . . bead base line
CL . . . center line
CCL . . . carcass line
PP . . . separation start point at which carcass and belt separate from each other
RA . . . tire rotation axis
RL . . . straight line, in radial direction, which extends through clip width end
TC . . . thickness of carcass
TS . . . thickness of sidewall rubber
WB1 . . . width of outer belt layer
WB2 . . . width with which inner belt layer and carcass are layered
WC . . . maximum width of carcass
WL . . . clip width
WM . . . entire width of mold

The invention claimed is:

1. A pneumatic tire comprising:
a tread;
a pair of sidewalls that extend from ends, respectively, of the tread almost inward in a radial direction;
a pair of clinches disposed inward of the sidewalls, respectively, in the radial direction;
a pair of beads disposed inward of the clinches, respectively, in an axial direction; and
a carcass extended, along inner sides of the tread and the sidewalls, on and between one of the beads and the other of the beads,
wherein
a profile of the tire includes a ground-contact surface, and a pair of side surfaces that extend from the ground-contact surface almost inward in the radial direction,
a maximum value of a distance, in the axial direction, between both the side surfaces represents a maximum width of the tire,
a boundary between the ground-contact surface and each side surface is a point PB;
a point, on the side surface, representing the maximum width is a point PW;
an imaginary straight line that extends through each point PW in the axial direction is a first reference line;
a length, in the radial direction, from the first reference line to an equator is a first reference length;
a point, on the side surface, which is disposed outward of the point PW in the radial direction, and which is distant from the first reference line in the radial direction, by a length corresponding to ⅓ of the first reference length, is a point PU1;
a point, on the side surface, which is disposed outward of the point PU1 in the radial direction, and which is distant from the point PU1 in the radial direction, by a length corresponding to ⅓ of the first reference length, is a point PU2;
a point, on the side surface, disposed at a mid-position between the point PU2 and the point PU1 in the radial direction, is a point PU3;
a point, on the side surface, disposed at a mid-position between the point PU2 and the point PB in the radial direction, is a point PU4;
an end point of the side surface is a point PT;
an imaginary straight line that extends through each point PT in the axial direction is a second reference line;
a length, in the radial direction, from the second reference line to the equator represents a cross-sectional height of the tire;
a length, in the radial direction, from the second reference line to the point PW is a second reference length;
a point, on the side surface, which is disposed inward of the point PW in the radial direction, and which is distant from the first reference line in the radial direction, by a length corresponding to ⅓ of the second reference length, is a point PL1;
a point, on the side surface, which is disposed inward of the point PL1 in the radial direction, and which is distant from the first reference line in the radial direction, by a length corresponding to 11/20 of the second reference length, is a point PL2;
a thickness of each sidewall at the point PW is a reference thickness,
a zone from the point PB to the point PW on each side surface is formed by three main arcs,
the main arcs are a first main arc, a second main arc that extends almost outward from the first main arc in the radial direction, and a third main arc that extends almost outward from the second main arc further in the radial direction,
the first main arc extends through the point PW and the point PU1, the second main arc extends through the point PU1, the point PU3, and the point PU2,
the third main arc extends through the point PU2, the point PU4, and the point PB,
a ratio of a radius RM2 of curvature of the second main arc to a radius RM1 of curvature of the first main arc is greater than or equal to 1.45 and not greater than 3.26,
a ratio of a radius RM3 of curvature of the third main arc to the radius RM1 of curvature of the first main arc is greater than or equal to 0.45 and not greater than 0.56,
an extension line from the first main arc extends through an imaginary point PU5 defined such that the imaginary point PU5 and the point PU1 are line-symmetric with respect to the first reference line,
a zone from the point PW to the point PL2 on each side surface is formed by a fourth main arc,
the fourth main arc extends through the point PW, the point PL1, and the point PL2,
an extension line from the fourth main arc extends through an imaginary point PL3 defined such that the imaginary point PL3 and the point PL1 are line-symmetric with respect to the first reference line,
each sidewall has a first recess and a second recess that are recessed inward from the side surface,
the first recess is disposed outward of the point PW in the radial direction,
the second recess is disposed inward of the point PW in the radial direction,
a ratio of a length SU, in the radial direction, from the first reference line to a bottom of the first recess, relative to the cross-sectional height, is greater than or equal to 0.08 and not greater than 0.24,
a ratio of a length SL, in the radial direction, from the first reference line to a bottom of the second recess, relative to the cross-sectional height, is greater than or equal to 0.08 and not greater than 0.24,
a ratio of a depth TU of the first recess to the reference thickness is greater than or equal to 0.16 and not greater than 0.48, and
a ratio of a depth TL of the second recess to the reference thickness is greater than or equal to 0.16 and not greater than 0.48.

2. The pneumatic tire according to claim 1, wherein
a contour of the first recess is formed by two secondary arcs,
the secondary arcs are a first secondary arc, and a second secondary arc that extends almost outward from the first secondary arc in the radial direction,
a point, on an outer surface of each sidewall, disposed at a mid-position between the point PW and the bottom of the first recess in the radial direction, is a point PU6,
a point, on the outer surface of each sidewall, disposed at a mid-position between the point PU3 and the bottom of the first recess in the radial direction, is a point PU7,
the first secondary arc extends through the point PW, the point PU6, and the bottom of the first recess,
the second secondary arc extends through the bottom of the first recess, the point PU7, and the point PU3,
a ratio of a radius RS1 of curvature of the first secondary arc to the radius RM1 of curvature of the first main arc is greater than or equal to 0.45 and not greater than 1 18, and
a ratio of a radius RS2 of curvature of the second secondary arc to the radius RM1 of curvature of the first main arc is greater than or equal to 0.63 and not greater than 1.54.

3. The pneumatic tire according to claim 1, wherein
a contour of the second recess is formed by two secondary arcs,
the secondary arcs are a third secondary arc, and a fourth secondary arc that extends almost inward from the third secondary arc in the radial direction,
a point, on the outer surface of each sidewall, disposed at a mid-position between the point PW and the bottom of the second recess in the radial direction, is a point PL4,
a point, on the outer surface of each sidewall, disposed at a mid-position between the point PL2 and the bottom of the second recess in the radial direction, is a point PL5,
the third secondary arc extends through the point PW, the point PL4, and the bottom of the second recess,
the fourth secondary arc extends through the bottom of the second recess, the point PL5, and the point PL2,
a ratio of a radius RS3 of curvature of the third secondary arc to a radius RM4 of curvature of the fourth main arc is greater than or equal to 0.39 and not greater than 0.91, and
a ratio of a radius RS4 of curvature of the fourth secondary arc to the radius RM4 of curvature of the fourth main arc is greater than or equal to 0.65 and not greater than 1.95.

4. The pneumatic tire according to claim 1, wherein
the radius RM2 of curvature of the second main arc is greater than or equal to 80 mm and not greater than 180 mm, and
the radius RM3 of curvature of the third main arc is greater than or equal to 25 mm and not greater than 31 mm.

5. The pneumatic tire according to claim 1, wherein
the length SU in the radial direction is greater than or equal to 10 mm and not greater than 30 mm,
the length SL in the radial direction is greater than or equal to 10 mm and not greater than 30 mm,
the depth TU is greater than or equal to 0.4 mm and not greater than 1.2 mm, and
the depth TL is greater than or equal to 0.4 mm and not greater than 1.2 mm.

6. The pneumatic tire according to claim 2, wherein
the radius RS1 of curvature of the first secondary arc is greater than or equal to 25 mm and not greater than 65 mm, and
the radius RS2 of curvature of the second secondary arc is greater than or equal to 35 mm and not greater than 85 mm.

7. The pneumatic tire according to claim 3, wherein
the radius RS3 of curvature of the third secondary arc is greater than or equal to 30 mm and not greater than 70 mm, and
the radius RS4 of curvature of the fourth secondary arc is greater than or equal to 50 mm and not greater than 150 mm.

8. The pneumatic tire according to claim 1, wherein a contour of the first recess is formed by plural secondary arcs, and all of these secondary arcs are convex outward.

9. The pneumatic tire according to claim 1, wherein a contour of the second recess is formed by plural secondary arcs, and all of these secondary arcs are convex outward.

10. The pneumatic tire according to claim 1, wherein two recesses exist between the point PU2 and the point PL2 on each side surface.

* * * * *